US009088927B2

(12) United States Patent
Kodama

(10) Patent No.: US 9,088,927 B2
(45) Date of Patent: Jul. 21, 2015

(54) COMMUNICATION TERMINAL DEVICE AND COMMUNICATION CONTROL METHOD

(71) Applicant: FUJITSU LIMITED, Kawasaki-shi, Kanagawa (JP)

(72) Inventor: Takeshi Kodama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 13/910,918

(22) Filed: Jun. 5, 2013

(65) Prior Publication Data

US 2013/0329587 A1 Dec. 12, 2013

(30) Foreign Application Priority Data

Jun. 6, 2012 (JP) ................................ 2012-129210

(51) Int. Cl.

| | |
|---|---|
| ***H04W 36/30*** | (2009.01) |
| ***H04W 36/08*** | (2009.01) |
| *H04W 60/04* | (2009.01) |
| *H04W 68/00* | (2009.01) |

(52) U.S. Cl.

CPC .............. *H04W 36/30* (2013.01); *H04W 36/08* (2013.01); *H04W 60/04* (2013.01); *H04W 68/00* (2013.01)

(58) Field of Classification Search

None

See application file for complete search history.

(56) References Cited

U.S. PATENT DOCUMENTS

| | | | | |
|---|---|---|---|---|
| 6,795,425 | B1 * | 9/2004 | Raith ............................ | 370/345 |
| 2001/0016493 | A1 | 8/2001 | Kim et al. | |
| 2005/0232200 | A1 | 10/2005 | Jeong et al. | |
| 2009/0190555 | A1 | 7/2009 | Oguchi | |
| 2010/0069094 | A1 * | 3/2010 | Chin et al. .................... | 455/458 |
| 2010/0103848 | A1 * | 4/2010 | Chin et al. .................... | 370/311 |
| 2010/0105389 | A1 | 4/2010 | Chin et al. | |

FOREIGN PATENT DOCUMENTS

| | | | |
|---|---|---|---|
| JP | 2000-092552 | A | 3/2000 |
| JP | 2009-182549 | A | 8/2009 |
| WO | WO 2010/033520 | A1 | 3/2010 |

OTHER PUBLICATIONS

European Search Report, European Patent Application No. 13169843.3 dated Oct. 16, 2013.

(Continued)

*Primary Examiner* — Kerri Rose

(74) *Attorney, Agent, or Firm* — Arent Fox LLP

(57) ABSTRACT

A radio communication terminal including: a processor configured to communicate, when a reception quality of a radio signal of the base station is lower than a threshold value and when a first group identification information identifying a base station group to which the base station belongs is not received from the base station, to each of neighbor base stations sequentially in an intermittent reception period, to specify a specified neighbor base station of the neighbor base stations, the specified neighbor base station belonging to the base station group, based on whether a second group identification information is received from each of the neighbor base stations or not and based on the first group identification and the second group identification are same or not, to select the specified base station preferentially to which the terminal is to hand over, among the neighbor base stations.

14 Claims, 23 Drawing Sheets

(56) References Cited

OTHER PUBLICATIONS

IEEE Std 802.16e-2005, Part 16: Air Interface for Fixed and Mobile Broadband Wireless Access Systems, Amendment 2: Physical and Medium Access Control Layers for Combined Fixed and Mobile Operation in Licensed Bands, IEEE Comp Soc and the IEEE Micro Theo Tech Soc, Feb. 28, 2006.

* cited by examiner

FIG. 2

| |
|---|
| SIGNAL TYPE IDENTIFIER |
| PG-ID |
| HASH VALUE |
| ACTION CODE |

FIG. 4

| BS-ID | PG-ID | CINR(dBm) |
|---|---|---|
| 10a | PG#1 | 5 |
| 10b | PG#1 | 15 |
| 10c | - | 10 |
| ⋮ | ⋮ | ⋮ |

FIG. 5

| PG-ID | CYCLE (THE NUMBER OF FRAMES) | OFFSET (THE NUMBER OF FRAMES) | INTERMITTENT RECEPTION PERIOD (THE NUMBER OF FRAMES) |
| --- | --- | --- | --- |
| PG#1 | 200 | 64 | 5 |

FIG. 7

| FREQUENCY ID | FREQUENCY VALUE (GHz) |
|---|---|
| FA1 | 2.50 |
| FA2 | 2.51 |
| FA3 | 2.52 |

FIG. 10

| ACTION CODE | MEANING |
|---|---|
| 0b00 | No Action Required |
| 0b01 | Perform Ranging to establish location and acknowlegde message |
| 0b10 | Enter Network |

FIG. 15

| FRAME NUMBER OF P SIGNAL |
|---|
| 232 |
| 264 |
| 432 |
| 464 |
| 632 |
| 664 |

FIG. 17

| PG-ID | CYCLE (THE NUMBER OF FRAMES) | OFFSET (THE NUMBER OF FRAMES) | INTERMITTENT RECEPTION PERIOD (THE NUMBER OF FRAMES) |
|---|---|---|---|
| PG#1 | 200 | 64 | 5 |
| PG#1 | 200 | 32 | 5 |

COMMUNICATION TERMINAL DEVICE AND COMMUNICATION CONTROL METHOD

CROSS-REFERENCE TO RELATED APPLICATIONS

This application is based upon and claims the benefit of priority from the prior Japanese Patent Application No. 2012-129210 filed on Jun. 6, 2012, the entire contents of which are incorporated herein by reference.

FIELD

The embodiments discussed herein are related to a communication terminal device and a communication control method.

BACKGROUND

Conventionally, a communication terminal device (hereinafter, referred to as "a communication terminal") existing in a communication area of a base station performs processing called intermittent reception to reduce power consumption in a standby time. In the intermittent reception, which is processing in a transmission period in which a paging signal calling the communication terminal is cyclically transmitted from the base station, the communication terminal is in a state where the power is turned on (hereinafter, referred to as "awake state"), and the communication terminal receives the paging signal in the awake state. In the intermittent reception, the communication terminal is in a state where the power is turned off (hereinafter, referred to as "sleep state") in a period other than the transmission period of the paging signal. That is, the communication terminal intermittently receives the paging signal from the base station (hereinafter, referred to as "handover source base station") of the area where the communication terminal exists. A period in which the communication terminal intermittently receives the paging signal from the handover source base station is referred to as an intermittent reception period.

In recent years, a plurality of base stations may form a logical group so that location information of the communication terminal that performs the intermittent reception is collectively managed by the plurality of base stations. For example, according to Worldwide Interoperability for Microwave Access (WiMAX), which is a communication standard specified in IEEE802.16e, this group is referred to a Paging Group (PG). The base stations and the communication terminal that belong to the PG share a PG-Identifier (ID), which is group identification information that identifies the PG, and the communication terminal may synchronize the intermittent reception period with the base stations belonging to the same PG. The paging signal received by the communication terminal during the intermittent reception period includes the PG-ID.

Here, although the communication terminal performs handover from the handover source base station to another base station, a handover destination base station may belong to a PG that is different from the PG of the handover source base station. In this case, processing (location update processing) for reporting new location information of the communication terminal to the handover destination base station is performed. The location update processing is performed in a period other than the above-described intermittent reception period. In other words, the location update processing is performed in a period in which the communication terminal is in the sleep state. Therefore, the communication terminal that performs the handover to the base station belonging to the PG that is different from the PG of the handover source base station consumes extra power for the location update processing as compared with the case of the handover to the base station belonging to the same PG.

On the contrary, to reduce if not eliminate the location update processing, there is well-known a technique for cyclically broadcasting the PG-ID of neighbor base stations of the handover source base station from the handover source base station to the communication terminal. According to this technique, the communication terminal receives the PG-ID of each neighbor base station and then determines, based on the received PG-ID, whether the neighbor base station belongs to the same PG as the handover source base station. When performing the handover, the communication terminal preferentially selects, from among the neighbor base stations, the neighbor base station that is determined to belong to the same PG as the handover source base station.

Depending on a moving speed of the communication terminal, the handover may be started even when the communication terminal does not receive the PG-ID of neighbor base stations from the handover source base station. Therefore, there is a technique proposed of the communication terminal for being coupled to the neighbor base station to obtain the PG-ID in advance from the paging signal held by the neighbor base station in a case where the handover is determined to be started even when the communication terminal does not received the PG-ID.

[Patent Document 1] Japanese Laid-open Patent Publication No. 2009-182549

SUMMARY

According to an aspect of the invention, a radio communication terminal including: a memory configured to store an intermittent reception period from a base station, and a processor configured to communicate, when a reception quality of a radio signal of the base station is lower than a threshold value and when a first group identification information identifying a base station group to which the base station belongs is not received from the base station, to each of neighbor base stations sequentially in the intermittent reception period, to specify a specified neighbor base station of the neighbor base stations, the specified neighbor base station belonging to the base station group, based on whether a second group identification information is received from each of the neighbor base stations or not and based on the first group identification and the second group identification are same or not, to select the specified base station preferentially to which the terminal is to hand over, among the neighbor base stations.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2 is a diagram illustrating a data configuration example of a P signal;

FIG. 4 is a diagram illustrating an example of a base station information storage unit;

FIG. 5 is a diagram illustrating an example of an intermittent reception period information storage unit;

FIG. 7 is a diagram illustrating an example of a frequency information storage unit;

FIG. 10 is a diagram illustrating an example of contents of an action code;

FIG. 15 is a diagram illustrating an example of a reception history of the P signal;

FIG. 17 is a diagram illustrating an example of the other intermittent reception period stored in an intermittent reception period information storage unit;

DESCRIPTION OF EMBODIMENTS

The conventional technique in which the communication terminal obtains the PG-ID in advance from the paging signal held by the neighbor base station has a problem in that the power caused by handover is increased wastefully.

That is, according to the conventional technique, the processing for obtaining the PG-ID in advance before performance of the handover is performed during a period other than the intermittent reception period, that is, in the period in which the communication terminal is in the sleep state. Due to this, according to the conventional technique, the communication terminal consumes extra power for the processing for obtaining the PG-ID before the performance of the handover. As a result, the power caused by the handover is increased wastefully.

The disclosed technique is invented to solve the above-described problem and to provide a communication terminal device and a communication control method for properly reduce the power consumption caused by the handover.

The embodiments of the communication terminal and the communication control method disclosed in the present application will be described based on the diagrams. The disclosed technique is not limited to the embodiments.

First Embodiment

Figure 1:
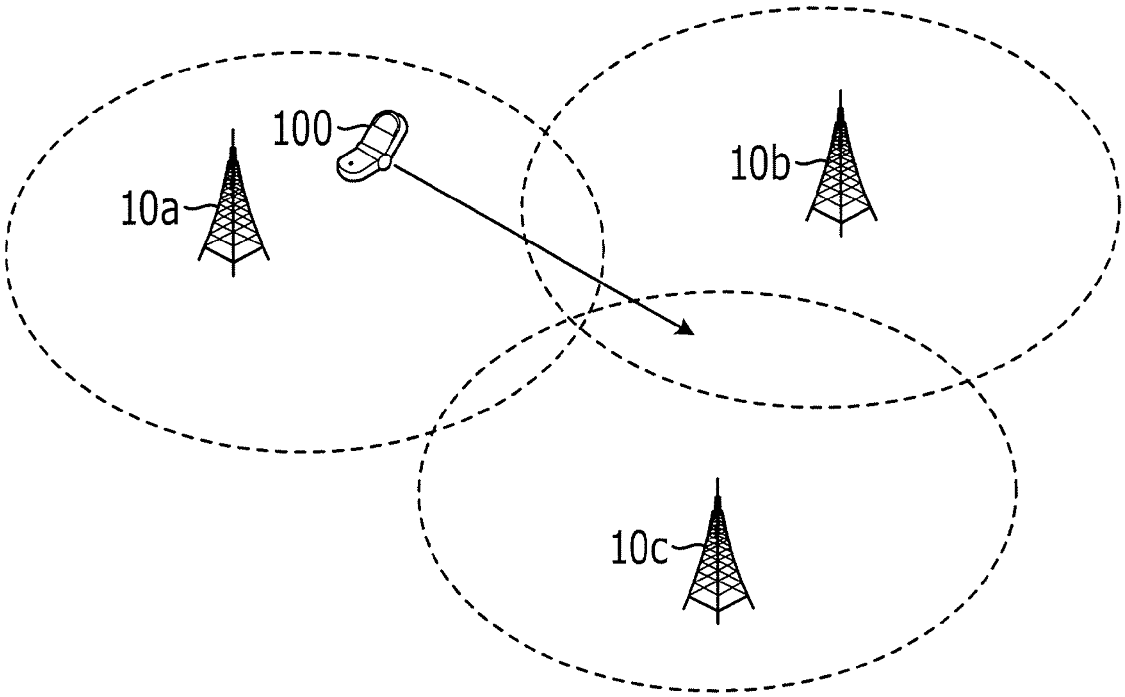
FIG. 1 is a diagram illustrating a configuration example of a radio communication system that includes a communication terminal according to a first embodiment.

FIG. 1 is a diagram illustrating a configuration example of a radio communication system that includes a communication terminal according to a first embodiment. As illustrated in FIG. 1, the radio communication system includes base stations 10*a* to 10*c* and a communication terminal 100. The base stations 10*a* to 10*c* each form a communication area indicated with a dashed line.

The communication terminal 100 is a portable radio communication device such as a mobile phone, for example. In the example illustrated in FIG. 1, the communication terminal 100 moves from a communication are of the base station 10*a* to the communication area of the base stations 10*ba* and 10*c* as neighbor base stations that are neighbor to the base station 10*a*. The communication terminal 100 performs intermittent reception to intermittently receive a paging signal (hereinafter, referred to as "Paging (P) signal") from the base station 10*a* (hereinafter, referred to as "handover (HO) source base station 10*a*") making a cell where the communication terminal 100 currently exists. A period in which the communication terminal 100 intermittently receives the P signal from the HO source base station 10*a* is referred to as an intermittent reception period. The communication terminal 100 is in an awake state during the intermittent reception period and is in a sleep state during a period other than the intermittent reception period.

According to the first embodiment, a plurality of base stations forms a logical group so that location information of the communication terminal 100 that intermittently receives the P signal is collectively managed by the plurality of base stations. This logical group is referred to as a Paging Group (PG) according to WiMAX, which is a communication standard specified in IEEE802.16a, for example. In the example illustrated in FIG. 1, the HO source base station 10*a* and the base station 10*b* form a PG, and the base station 10*c* and another base station (not illustrated) form another PG. The HO source base station 10*a*, the base station 10*b*, and the communication terminal 100 that belong to the same PG share a PG-ID "PG#1" as identification information that identifies the PG. The communication terminal 100 may synchronize the intermittent reception period between the HO source base station 10*a* and the base station 10*b*. The PG-ID is an example of group identification information. That is, when the communication terminal 100 performs handover from the HO source base station 10*a* to the base station 10*b*, the base station 10*b* as the base station of the handover destination (hereinafter, referred to as "HO destination base station") belongs to the same PG as the HO source base station 10*a*. Therefore, the communication terminal 100 may reduce if not eliminate location update processing with respect to the base station 10*b* as the HO destination base station.

On the other hand, since the base station 10*c* and the communication terminal 100 belonging to different PGs do not share the PG-ID, the communication terminal 100 may not synchronize the intermittent reception period with the base station 10*c*. That is, when the communication terminal 100 performs the handover from the HO source base station 10*a* to the base station 10*c*, the base station 10*c* as the HO destination base station belongs to a PG that is different from the PG of the HO source base station 10*a*. Due to this, the communication terminal 100 performs the location update processing with respect to the base station 10*c* as the HO destination base station.

On the contrary, to reduce if not eliminate the location update processing, there is well-known a technique for cyclically broadcasting the PG-ID of the neighbor base stations of the HO source base station to the communication terminal 100 from the HO source base station. According to this technique, the communication terminal 100 receives the PG-ID of each neighbor base station and then determines, based on the received PG-ID, whether the neighbor base station belongs to the same PG as the HO source base station. When performing the handover, the communication terminal 100 selects, from among the neighbor base stations, the neighbor base station, which is determined to belong to the same PG as the HO source base station, as the HO destination base station.

Depending on a moving speed of the communication terminal 100, the handover may be started even when the communication terminal 100 does not receive the PG-ID from the HO source base station. As a result, the communication terminal 100 may perform the location update processing with respect to the HO destination base station. To prevent the above-described situation, there is a conventional technique for obtaining the PG-ID in advance from the P signal held by the neighbor base station. However, the processing for obtaining the PG-ID before performance of the handover is performed during the period in which the communication terminal 100 is in the sleep state. Therefore, the communication terminal 100 consumes extra power. As a result, the power caused by the handover is increased wastefully.

When the communication terminal 100 according to the first embodiment does not receive the PG-ID of each neighbor base station from the HO source base station, the communication terminal 100 is sequentially coupled to the neighbor base stations during the intermittent reception period to receive the P signal from each of the coupled neighbor base stations. Based on the PG-ID included in the received P signal, the communication terminal 100 determines whether the neighbor base station belongs to the same PG as the HO source base station and then preferentially selects, from among the neighbor base stations, the neighbor base station, which is determined to belong to the same PG, as the HO destination base station. Therefore, the communication terminal 100 according to the first embodiment may reduce if not eliminate the performance of the location update processing with respect to the HO destination base station after the handover and may also omit obtaining processing of the PG-ID performed during while the communication terminal 100 is in the sleep state. As a result, the communication terminal 100 may properly reduce the power consumption caused by the handover.

Figure 2:
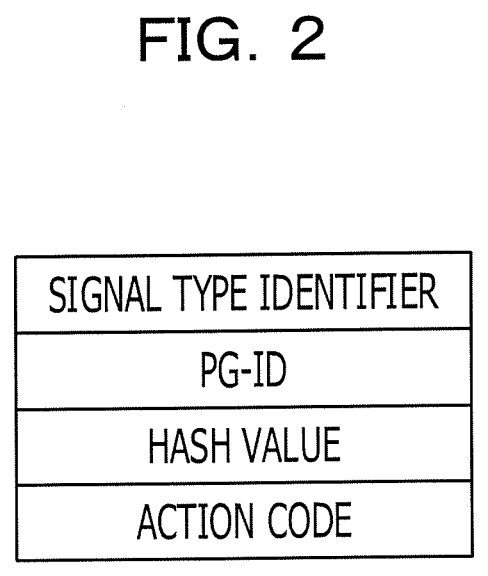

Below is a description of a data configuration example of the P signal received by the communication terminal during the intermittent reception period. FIG. 2 is a diagram illustrating a data configuration example of the P signal. As illustrated in FIG. 2, the P signal includes a PG-ID. The P signal further includes a signal type identifier as well as the PG-ID. The signal type identifier stores an identifier that identifies the P signal. The P signal may include a hash value and an action code as well as the PG-ID and the signal type identifier. The hash value stores a hash value indicating that the P signal includes an action code addressed to the communication terminal 100. The action code stores an action code addressed to the communication terminal 100.

Figure 3:
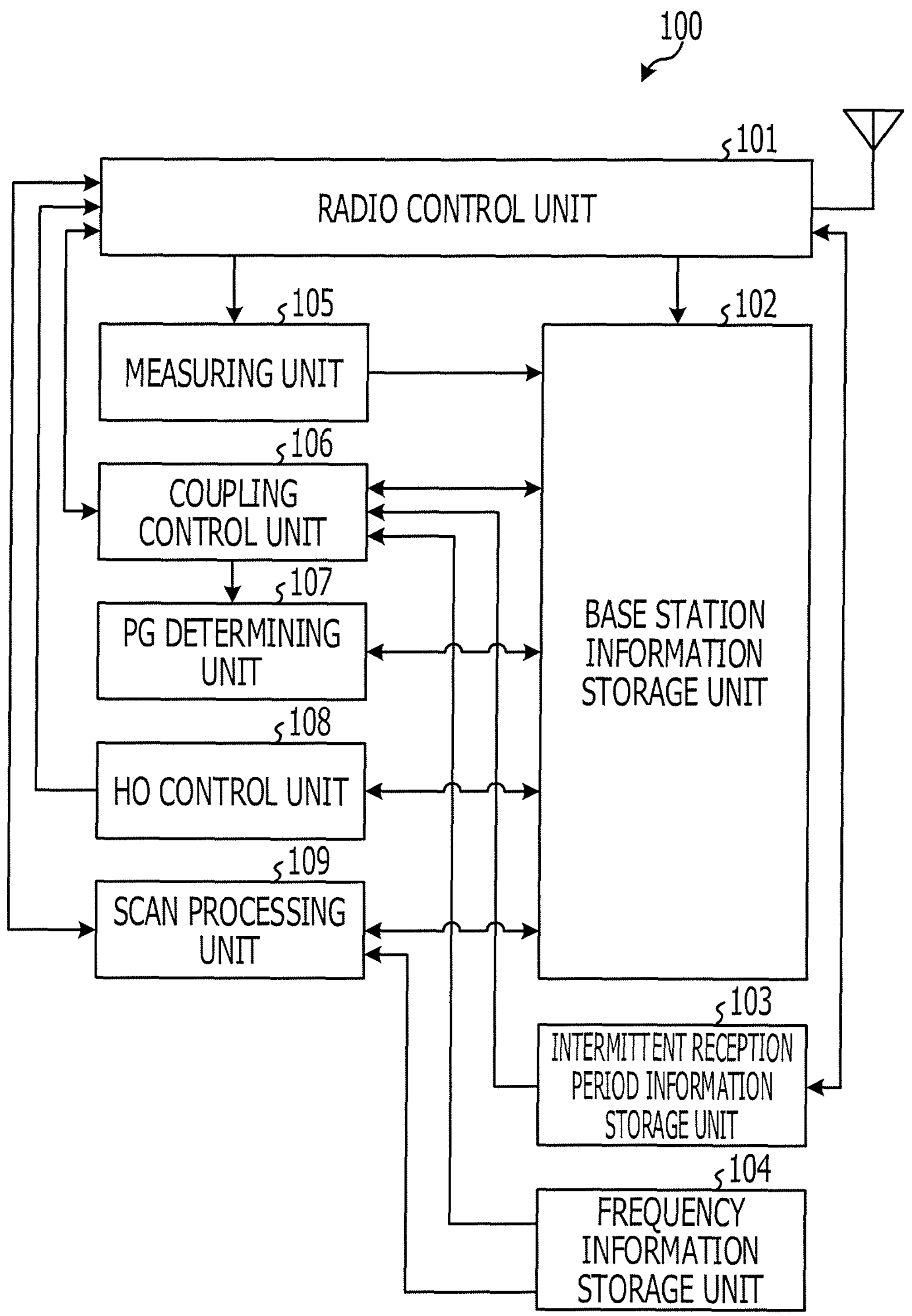
FIG. 3 is a function block diagram illustrating a configuration of the communication terminal according to the first embodiment.

A configuration of the communication terminal 100 illustrated in FIG. 1 will be described below. FIG. 3 is a function block diagram illustrating a configuration of the communication terminal according to the first embodiment. As illustrated in FIG. 3, the communication terminal 100 includes a radio control unit 101, a base station information storage unit 102, an intermittent reception period information storage unit 103, a frequency information storage unit 104, a measuring unit 105, a coupling control unit 106, a PG determining unit 107, an HO control unit 108, and a scan processing unit 109. The communication terminal 100 includes an antenna to be coupled to the radio control unit 101.

The radio control unit 101 controls radio communication among the communication terminal 100 and the base stations 10*a* to 10*c*. While being coupled to the HO source base station 10*a*, the radio control unit 101 assigns a Base Station-Identifier (BS-ID) that is identifier information identifying the HO source base station 10*a* to the HO source base station 10*a* and registers the assigned BS-ID in the base station information storage unit 102.

When receiving an intermittent reception code (DREG-CMD) from the HO source base station 10*a*, the radio control unit 101 extracts the PG-ID included in the DREG-CMD, a cycle of the intermittent reception period, an offset of the intermittent reception period, and the intermittent reception period. The radio control unit 101 registers the PG-ID in the base station information storage unit 102 described below in association with the BS-ID of the HO source base station 10*a*. The radio control unit 101 associates and registers the PG-ID, the cycle of the intermittent reception period, the offset of the intermittent reception period, and the intermittent reception period in the intermittent reception period information storage unit 103 described below. The radio control unit 101 starts the intermittent reception to intermittently receive the P signal from the HO source base station 10*a*. That is, the radio control unit 101, which in the awake state during the intermittent reception period stored in the intermittent reception period information storage unit 103, receives the P signal from the HO source base station 10*a* and then outputs the received P signal to the measuring unit 105. On the other hand, the radio control unit 101, which is in the sleep state during a period other than the intermittent reception period stored in the intermittent reception period information storage unit 103, stops receiving the signal from the HO source base station.

The radio control unit 101 receives various types of signals transmitted from one of the base stations 10*a* to 10*c* via the antenna, performs receiving processing such as down-convert, A/D conversion, demodulation, or the like on the received signal, and outputs the signal subjected to the receiving processing to the measuring unit 105 and the coupling control unit 106.

The radio control unit 101 switches the present frequency to a frequency that is set by the coupling control unit 106. After switching the frequency, the radio control unit 101 receives the various type of signals transmitted from one of the base stations 10*a* to 10*c* via the antenna, performs the receiving processing (down-convert, A/D conversion, demodulation, or the like) on the received signal, and outputs the signal subjected to the receiving processing to the coupling control unit 106.

The radio control unit 101 receives information of the HO destination base station selected by the HO control unit 108 and then performs the handover from the HO source base station to the HO destination base station.

Figure 4:
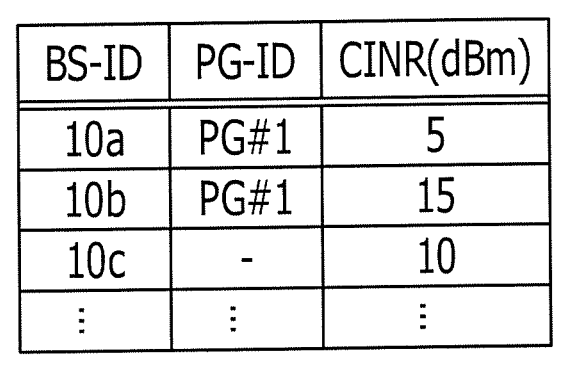

The base station information storage unit 102 stores information related to the HO source base station 10*a* and the neighbor base station as base station information. The base station information storage unit 102 is a storage device such as a memory and a hard disk. FIG. 4 is a diagram illustrating an example of the base station information storage unit. As illustrated in FIG. 4, the base station information storage unit 102 associates and stores a BS-ID, a PG-ID, and a Carrier to Interference and Noise Ratio (CINR). The BS-ID is identification information that identifies the HO source base station 10*a* or the neighbor base station. The PG-ID is identification information that identifies the PG to which the base station identified by the BS-ID belongs to. The CINR is a value indicating a reception quality of a radio wave of the base station identified by the BS-ID. A higher value of the CINR indicates a better reception quality of the radio wave.

For example, the first row in FIG. 4 indicates that the HO source base station 10*a* of the BS-ID "10*a*" belongs to the PG of the PG-ID "PG#1" and that the CINR is "5 dBm." The second row in FIG. 4 indicates that the base station 10*b* of the BS-ID "10*b*" as the neighbor base station belongs to the PG of the PG-ID "PG#1" that is the same PG as the HO source base station and that the CINR is "15 dBm." As for the third row in FIG. 4, the base station 10*c* of the BS-ID "10*c*" as the neighbor base station belongs to a PG that is different from the PG of the HO source base station 10*a*, so that the column of the PG-ID indicates a blank column "-."

The intermittent reception period information storage unit 103 stores information related to the intermittent reception period in which the communication terminal 100 intermittently receives the P signal from the HO source base station 10*a* as intermittent reception period information. The intermittent reception period information storage unit 103 is a storage device such as a memory and a hard disk. FIG. 5 is a diagram illustrating an example of the intermittent reception period information storage unit. As illustrated in FIG. 5, the intermittent reception period information storage unit 103 associates and stores a PG-ID, a cycle, an offset, and an intermittent reception period. The PG-ID is identification information that identifies the PG to which the HO source base station 10*a* belongs to. The cycle indicates a cycle of the intermittent reception period. In other words, the cycle indicates the number of frames corresponding to the period in which the intermittent reception period is cyclically repeated. The offset is an offset of the intermittent reception period. In other words, the offset indicates the number of frames corresponding to the period starting from the frame of a frame number "0" to the first frame of the intermittent reception period. The intermittent reception period is an intermittent reception period in which the communication terminal 100 intermittently receives the P signal from the HO source base station. In other words, the intermittent reception period indicates the number of frames corresponding to the intermittent reception period.

In the example illustrated in FIG. 5, "PG-ID" indicates "PG#1," "cycle" indicates "200" frames, "offset" indicates "64" frames, and "intermittent reception period" indicates "5" frames.

Figure 6:
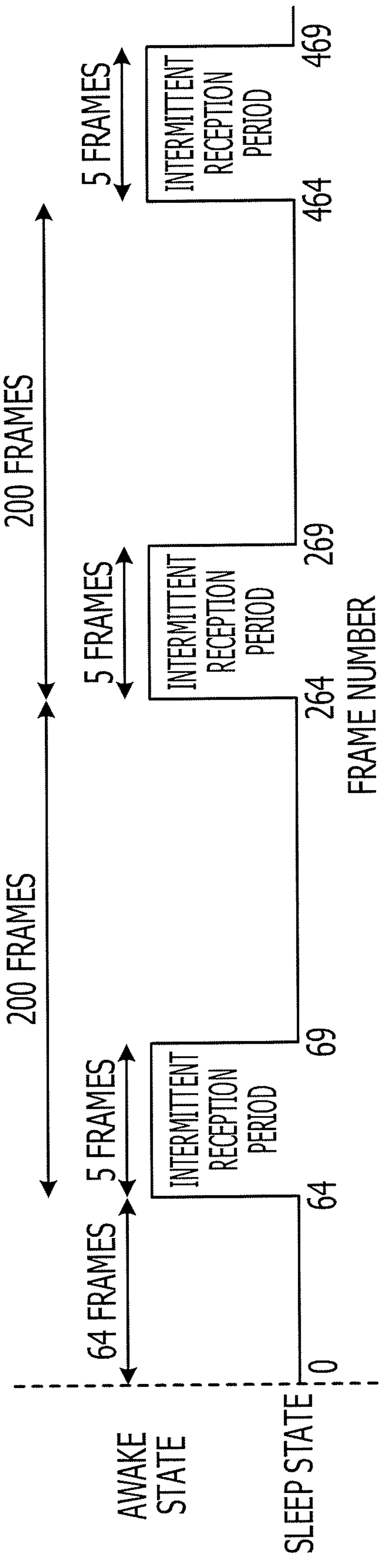
FIG. 6 is a diagram illustrating an example of an intermittent reception action.

FIG. 6 illustrates the example of the intermittent reception action using the intermittent reception period information illustrated in FIG. 5. FIG. 6 is a diagram illustrating an example of the intermittent reception action. As illustrated in FIG. 6, the communication terminal 100, which is in the awake state during the intermittent reception period stored in the intermittent reception period information storage unit 103, receives various types of signals from the HO source base station 10*a*, and the communication terminal 100, which is in the sleep state during a period other than the intermittent reception period, stops receiving the signals. The communication terminal 100 references to the intermittent reception period information illustrated in FIG. 5. When the first intermittent reception period comes at time of the frame of the frame number "64" following "64" frames from the frame of the frame number "0," the communication terminal 100 makes the transition from the sleep state to the awake state. The communication terminal 100 receives the P signal from the HO source base station 10*a* that belongs to the PG of the PG-ID "#1" during the intermittent reception period for "5" frames. When the intermittent reception period for 5 frames from the frame of the frame number "64" to the frame of the frame number "69" ends, the communication terminal 100 makes the transition from the awake state to the sleep state. The intermittent reception period for 5 frames is repeated at "200" frame intervals.

The frequency information storage unit 104 stores the information related to the frequency used for the radio communication among the communication terminal 100 and the base stations 10*a* to 10*c* as frequency information. The frequency information storage unit 104 is a storage device such as a memory and a hard disk. FIG. 7 is a diagram illustrating an example of the frequency information storage unit. As illustrated in FIG. 7, the frequency information storage unit 104 associates and stores a frequency ID and a frequency value. The frequency ID is identification information that identifies a frequency assigned to one of the base stations 10*a* to 10*c*. Here, "FA1" indicates identification information that identifies a frequency assigned to the base station 10*a*, "FA2" indicates identification information that identifies a frequency assigned to the base station 10*b*, and "FA3" indicates identification information that identifies a frequency assigned to the base station 10*c*. The frequency value is a value of the frequency assigned to one of the base stations 10*a* to 10*c*.

For example, the first row in FIG. 7 indicates that the frequency used for the radio communication between the communication terminal 100 and the base station 10*a* is "2.50" GHz. The second row in FIG. 7 indicates that the frequency used for the radio communication between the communication terminal 100 and the base station 10*b* is "2.51" GHz. The third row in FIG. 7 indicates that the frequency used for the radio communication between the communication terminal 100 and the base station 10*c* is "2.52" GHz.

FIG. 3 is described below. The measuring unit 105 receives the P signal received from the HO source base station 10*a* from the radio control unit 101. Based on the received P signal, the measuring unit 105 measures the CINR as a value indicating the reception quality of the radio wave of the HO source base station 10*a*. The measuring unit 105 registers the measured CINR of the HO source base station 10*a* in association with the BS-ID of the HO source base station 10*a* in the base station information storage unit 102.

The coupling control unit 106 references to the base station information storage unit 102 to determine whether the CINR of the HO source base station 10*a* is lower than a prescribed threshold value α. The coupling control unit 106 references to the base station information storage unit 102 to determine whether the PG-ID of each of the base station 10*b* and the base station 10*c*, which are neighbor to the HO source base station 10*a*, is received from the HO source base station 10*a*. In other words, the coupling control unit 106 determines whether the PG-ID of each of the base station 10*b* and the base station 10*c* as the neighbor base station is registered in the base station information storage unit 102. When the CINR of the HO source base station 10*a* is lower than the threshold value α and when the PG-ID of each of the base station 10*b* and the base station 10*c* as the neighbor base station is not received from the HO source base station 10*a*, the coupling control unit 106 references to the intermittent reception period information storage unit 103. The coupling control unit 106 is sequentially coupled to the neighbor base stations during the intermittent reception period stored in the intermittent reception period information storage unit 103.

Specifically, when the intermittent reception period comes, the coupling control unit 106 obtains, from the frequency information storage unit 104, the frequency used for the radio communication between the communication terminal 100 and the base station 10*b*. By setting the frequency obtained from the frequency information storage unit 104 to the radio control unit 101, the coupling control unit 106 is coupled to the base station 10*b* as the neighbor base station. When the intermittent reception period comes again, the coupling control unit 106 obtains, from the frequency information storage unit 104, the frequency used for the radio communication between the communication terminal 100 and the base station 10*c*. By setting the frequency obtained from the frequency information storage unit 104 to the radio control unit 101, the coupling control unit 106 is coupled to the base station 10*c* as the neighbor base station.

The coupling control unit 106 receives the signal received from one of the coupled base stations 10*b* and 10*c* from the radio control unit 101. The coupling control unit 106 outputs the signal received from one of the coupled base stations 10*b* and 10*c* to the PG determining unit 107.

The PG determining unit 107 receives the signal received from one of the coupled base stations 10*b* and 10*c* as the neighbor base station. The PG determining unit 107 determines whether the signal received from one of the coupled base stations 10*b* and 10*c* as the neighbor base station includes the P signal, that is, whether the P signal is received from the neighbor base station coupled by the coupling control unit 106. When the P signal is not received from the coupled neighbor base station, the PG determining unit 107 determines that the coupled neighbor base station belongs to the PG that is different from the PG of the HO source base station 10*a* and then registers simply the BS-ID of the neighbor base station in the base station information storage unit 102. In the example illustrated in FIG. 1, the base station 10*c* as the neighbor base station belongs to the PG that is different from the PG of the HO source base station 10*a*. Due to this, the PG determining unit 107 may not receive the P signal from the coupled base station 10*c* and registers simply the BS-ID of the neighbor base station in the base station information storage unit 102.

When the P signal is received from the coupled neighbor base station, the PG determining unit 107 further determines, based on the received P signal, whether the neighbor base station belongs to the same PG as the HO source base station 10*a*. Specifically, the PG determining unit 107 reads out the PG-ID associated with the BS-ID of the HO source base station 10*a* from the base station information storage unit 102. The PG determining unit 107 compares the read-out PG-ID with the PG-ID included in the received P signal. When the read-out PG-ID matches the PG-ID included in the received P signal, the PG determining unit 107 determines that the neighbor base station belongs to the same PG as the HO source base station 10*a* and then registers the PG-ID included in the P signal in association with the BS-ID of the neighbor base station in the base station information storage unit 102. When the read-out PG-ID does not match the PG-ID included in the received P signal, the PG determining unit 107 determines that the neighbor base station belongs to a PG that is different from the PG of the HO source base station 10*a* and then registers simply the BS-ID of the neighbor base station in the base station information storage unit 102. In the example illustrated in FIG. 1, the base station 10*a* as the neighbor base station belongs to the same PG as the HO source base station 10*a*. Therefore, the PG determining unit 107 may receive the P signal from the coupled base station 10*b*, and the PG-ID of the HO source base station 10*a* read out from the base station information storage unit 102 matches the PG-ID included in the received P signal. Thus, the PG determining unit 107 associates and registers the PG-ID included in the received P signal and the BS-ID of the base station 10*b* as the neighbor base station in the base station information storage unit 102.

The HO control unit 108 controls the handover from the HO source base station 10*a* to the HO destination base station. The HO control unit 108 references to the base station information storage unit 102 to determine whether the CINR of the HO source base station 10*a* is lower than a prescribed threshold value γ. When the CINR of the HO source base station 10*a* is lower than the threshold value γ, the HO control unit 108 determines to perform the handover. When determining to perform the handover, the HO control unit 108 preferentially selects the neighbor base station, which is determined by the PG determining unit 107 to belong to the same PG as the HO source base station 10*a* among the neighbor base stations, as the HO destination base station.

Below is a description of an example of processing in which the HO control unit 108 preferentially selects the neighbor base station, which is determined to belong to the same PG as the HO source base station 10*a*, as the HO source base station. When the CINR of the HO source base station 10*a* is lower than the threshold value γ, the HO control unit 108 references to the base station information storage unit 102 to determine whether the neighbor base station belonging to the same PG as the HO source base station 10*a* exists in the neighbor base stations. In other words, the HO control unit 108 references to the base station information storage unit 102 to determine whether the neighbor base station having the PG-ID that matches the PG-ID of the HO source base station 10*a* exists. When the neighbor base station belonging to the same PG as the HO source base station 10*a*, that is, the neighbor base station having the PG-ID that matches the PG-ID of the HO source base station 10*a* exists, the HO control unit 108 selects the neighbor base station as the HO destination base station. On the contrary, when the neighbor base station belonging to the same PG as the HO source base station 10*a*, that is, the neighbor base station having the PG-ID that matches the PG-ID of the HO source base station 10*a* does not exists, the HO control unit 108 selects the neighbor base station of which the CINR is higher than the prescribed value as the HO destination base station. For example, when the CINR of the HO source base station 10*a* is lower than the threshold value γ, the HO control unit 108 references to the base station information storage unit 102 illustrated in FIG. 4. In this case, the base station 10*b* exists as the neighbor base station having the PG-ID that matches the PG-ID "PG#1" of the HO source base station 10*a*. Thus, the HO control unit 108 selects the base station 10*b* as the HO destination base station in preference to the base station 10*c*.

The HO control unit 108 outputs the information of the selected HO destination base station to the radio control unit 101.

The scan processing unit 109 measures the CINR of each neighbor base station. Specifically, the scan processing unit 109 references to the base station information storage unit 102 to determine whether the CINR of the HO source base station 10*a* is lower than a prescribed threshold value β. When the CINR of the HO source base station 10*a* is lower than the threshold value β, the scan processing unit 109 obtains the frequency used for the radio communication between the communication terminal 100 and the neighbor base station from the frequency information storage unit 104. By setting the frequency obtained from the frequency information storage unit 104 to the radio control unit 101, the scan processing unit 109 is coupled to the neighbor base station during the intermittent reception period to measure the CINR of the coupled neighbor base station. The scan processing unit 109 associates and registers the measured CINR of the neighbor base station and the BS-ID of the neighbor base station in the base station information storage unit 102.

Figure 8:
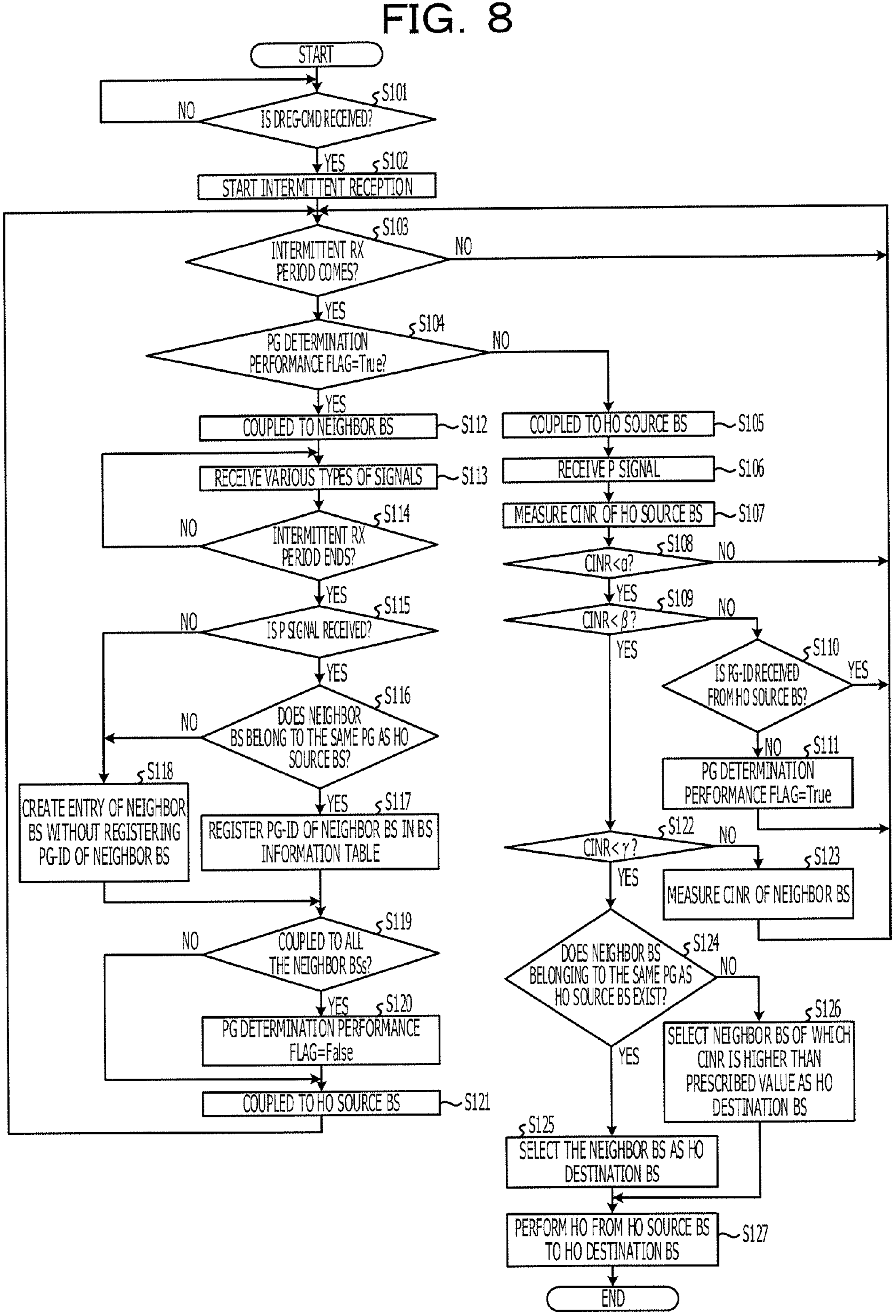
FIG. 8 is a flowchart illustrating a processing procedure by the communication terminal according to the first embodiment.

With reference to FIG. 8, a processing procedure by the communication terminal 100 according to the first embodiment will be described below. FIG. 8 is a flowchart illustrating the processing procedure by the communication terminal according to the first embodiment. The processing illustrated in FIG. 8 is performed at a time of receiving a DREG-CMD from the HO source base station 10*a*. In FIG. 8 or other FIGs, note that "base station" may be abbreviated as "BS" and "reception" may be abbreviated as "Rx".

As illustrated in FIG. 8, if the communication terminal 100 does not receive the DREG-CMD from the HO source base station 10*a* (NO in Operation S101), the process goes back to Operation S101. If the communication terminal 100 receives the DREG-CMD from the HO source base station 10*a* (YES in Operation S101), the communication terminal 100 starts the intermittent reception to intermittently receive the P signal from the HO source base station 10*a* (Operation S102). At this point, the communication terminal 100 registers the intermittent reception period included in the DREG-CMD in the intermittent reception period information storage unit 103.

When the intermittent reception period stored in the intermittent reception period information storage unit 103 does not come (NO in Operation S103), the communication terminal 100 is in the sleep state. The process goes back to Operation S103. When the intermittent reception period stored in the intermittent reception period information storage unit 103 comes (YES in Operation S103), the communication terminal 100 is in the awake sate. The communication terminal 100 determines whether "True (performance desired)" is set to a PG determination performance flag indicating whether determining processing by the PG determining unit 107 is desired (Operation S104).

When "False (performance not desired)" is set to the PG determination performance flag (NO in Operation S104), the communication terminal 100 is coupled to the HO source base station 10*a* (Operation S105). The communication terminal 100 receives the P signal from the HO source base station 10*a* (Operation S106). The communication terminal 100 measures the CINR of the HO source base station 10*a* based on the received P signal (Operation S107). The communication terminal 100 associates and registers the measured CINR of the HO source base station 10*a* and the BS-ID of the HO source base station 10*a* in the base station information storage unit 102.

The communication terminal 100 determines whether the CINR of the HO source base station 10*a* is lower than the threshold value α (Operation S108). If the CINR of the HO source base station 10*a* is equal to or higher than the threshold value α (NO in Operation S108), the communication terminal 100 is in the sleep state. The process goes back to Operation S103.

If the CINR of the HO source base station 10*a* is lower than the threshold value α (YES in Operation S108), the communication terminal 100 determines whether the CINR of the HO source base station 10*a* is lower than the threshold value β(<α) (Operation S109). If the CINR of the HO source base station 10*a* is equal to or higher than the threshold value β (NO in Operation S109), the communication terminal 100 references to the base station information storage unit 102 to determine whether the PG-ID of each neighbor base station is received from the HO source base station 10*a* (Operation S110). If the PG-ID of each neighbor base station is received from the HO source base station 10*a* (YES in Operation S110), the communication terminal 100 is in the sleep state. The process goes back to Operation S103.

If the PG-ID of each neighbor base station is not received from the HO source base station 10*a* (NO in Operation S110), the communication terminal 100 sets "True (performance desired)" to the PG determination performance flag (Operation S111). The process goes back to Operation S103. That is, when the CINR of the HO source base station 10*a* is lower than the threshold value α and when the PG-ID of each neighbor base station is not received from the HO source base station 10*a*, the communication terminal 100 proceeds the processing (Operation S112 to Operation S121) for being sequentially coupled to the neighbor base stations during the intermittent reception period.

When "True (performance desired)" is set to the PG determination performance flag (YES in Operation S104), the communication terminal 100 is coupled to one of the base stations 10*b* and 10*c* as the neighbor base station (Operation S112). The communication terminal 100 receives various types of signals from the coupled neighbor base station (Operation S113).

As for the communication terminal 100, if the intermittent reception period does not end (NO in Operation S114), the process goes back to Operation S113. On the contrary, if the intermittent reception period ends (YES in Operation S114), the communication terminal 100 determines whether the P signal is received from the coupled neighbor base station (Operation S115). If the signal is received from the coupled neighbor base station (YES in Operation S115), the communication terminal 100 determines, based on the PG-ID included in the received P signal, whether the neighbor base station belongs to the same PG as the HO source base station 10*a* (Operation S116). If the neighbor base station belongs to the same PG as the HO source base station 10*a* (YES in Operation S116), the communication terminal 100 associates and registers the PG-ID of the neighbor base station included in the P signal and the BS-ID of the neighbor base station in the base station information storage unit 102 (Operation S117).

If the signal is not received from the coupled neighbor base station (NO in Operation S115) and if the neighbor base station belongs to a PG that is different from the PG of the HO source base station 10*a* (NO in Operation S116), the communication terminal 100 performs the following processing. That is, the communication terminal 100 registers simply the BS-ID of the neighbor base station in the base station information storage unit 102 without registering the PG-ID of the neighbor base station (Operation S118).

If the communication terminal 100 is coupled to all the neighbor base stations (YES in Operation S119), the communication terminal 100 sets "False (performance not desired)" to the PG determination performance flag (Operation S120). The process goes to Operation S121. If the communication terminal 100 is not coupled to all the neighbor base stations (NO in Operation S119), the process goes to Operation S121. After that, the communication terminal 100 is coupled to the HO source base station 10*a* to be in the sleep state. The process goes back to Operation S103. That is, the communication terminal 100 is sequentially coupled to the neighbor base stations during the intermittent reception period until the communication terminal 100 is coupled to all the neighbor base stations.

If the CINR of the HO source base station 10$a$ is lower than the threshold value β (YES in Operation S109), the communication terminal 100 determines whether the CTNR of the HO source base station 10$a$ is lower than the threshold value $\gamma(<\beta)$ (Operation S122). If the CINR of the HO source base station 10$a$ is equal to or higher than the threshold value γ (NO in Operation S122), the communication terminal 100 measures the CINR of the neighbor base station (Operation S123) to be in the sleep state. The process goes back to Operation S103.

If the CINR of the HO source base station 10$a$ is lower than the threshold value γ (YES in Operation S122), the communication terminal 100 determines to perform the handover and performs the following processing. That is, the communication terminal 100 references to the base station information storage unit 102 to determine whether the neighbor base station belonging to the same PG as the HO source base station 10$a$ exists in the neighbor base stations (Operation S124). If the neighbor base station belonging to the same PG as the HO source base station 10$a$ exists in the neighbor base stations (YES in Operation S124), the communication terminal 100 selects the neighbor base station as the HO destination base station (Operation S125). If the neighbor base station belonging to the same PG as the HO source base station 10$a$ does not exist in the neighbor base stations (NO in Operation S124), the communication terminal 100 selects an neighbor base station of which the CINR is higher than the prescribed value as the HO destination base station (Operation S126).

The communication terminal 100 performs the handover from the HO source base station 10$a$ to the selected HO destination base station (Operation S127).

As described above, according to the first embodiment, the intermittent reception period information storage unit 103 of the communication terminal 100 stores the intermittent reception period in which the communication terminal 100 intermittently receives, from the HO source base station 10$a$, the P signal that includes the PG-ID identifying the PG formed by a plurality of base stations. When the CINR of the HO source base station 10$a$ is lower than the threshold value and when the coupling control unit 106 does not receive the PG-ID of each neighbor base station of the HO source base station 10$a$ from the HO source base station 10$a$, the coupling control unit 106 is sequentially coupled to the neighbor base stations during the intermittent reception period. Depending on whether the P signal is received from the coupled neighbor base station and based on the PG-ID included in the received P signal, the PG determining unit 107 determines whether the neighbor base station belongs to the same PG as the HO source base station 10$a$. When performing the handover from the HO source base station 10$a$ to the HO destination base station, the HO control unit 108 preferentially selects the neighbor base station, which is determined to belong to the same PG as the HO source base station 10$a$ from among the neighbor base stations, as the HO destination base station. According to the first embodiment, the communication terminal 100 may reduce if not eliminate the performance of the location update processing with respect to the HO destination base station after the handover and also may omit the obtaining processing of the PG-ID performed while the communication terminal 100 is in the sleep state. As a result, the communication terminal 100 may properly reduce the power consumption caused by the handover.

Second Embodiment

The first embodiment has described the example in which the communication terminal is sequentially coupled to the neighbor base stations during the intermittent reception period, the communication terminal uses the PG-ID included in the P signal received from the coupled neighbor base station to determine whether the neighbor base station belongs to the same PG as the HO source base station. A second embodiment will describe an example in which it is determined whether an action code is included in the P signal received from the neighbor base station, which is determined to belong to the same PG as the HO destination base station, and in which the prescribed processing is performed based on the action code determined to be included in the P signal.

Figure 9:
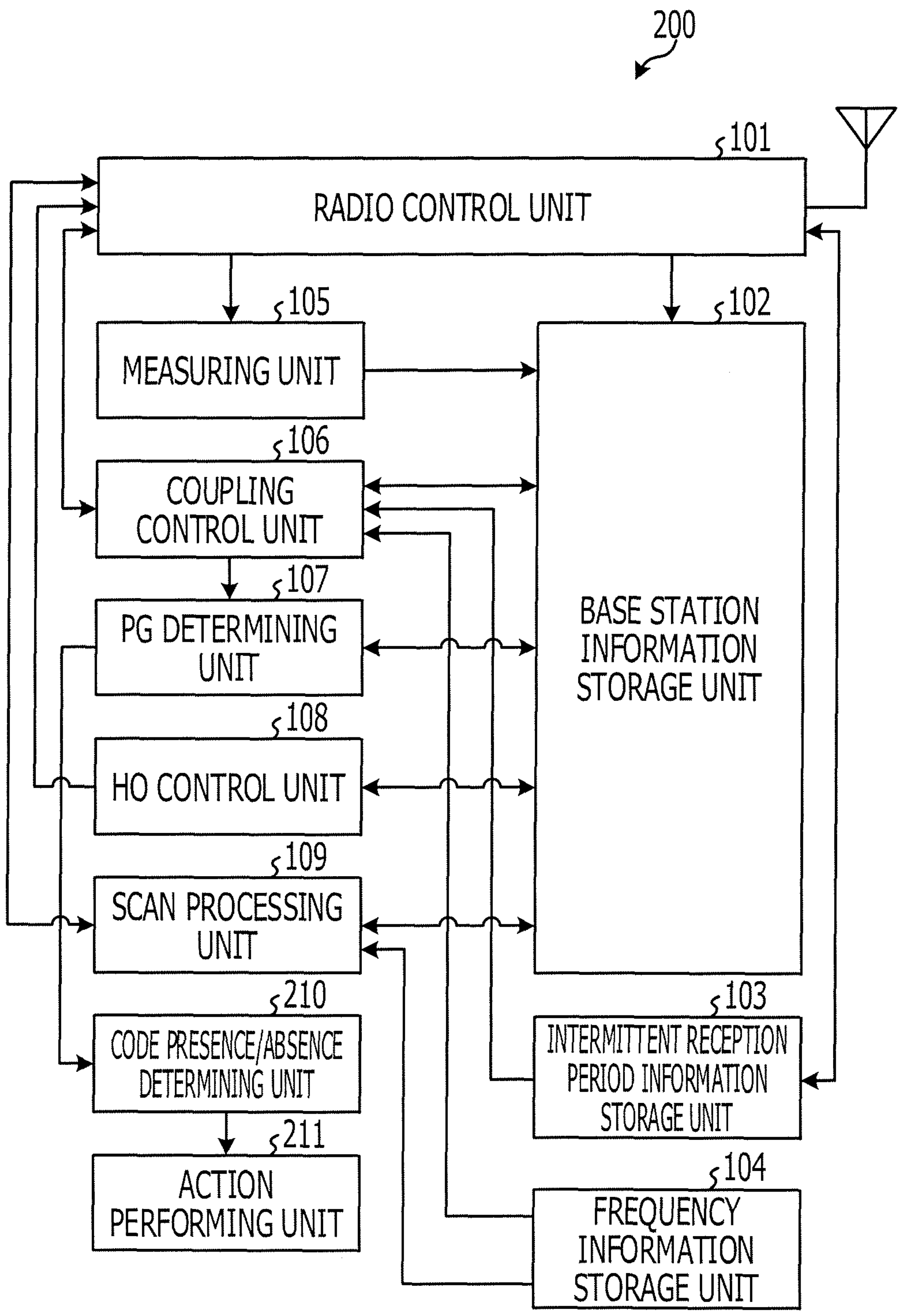
FIG. 9 is a function block diagram illustrating a configuration of a communication terminal according to a second embodiment.

With reference to FIG. 9, a configuration of a communication terminal 200 according to the second embodiment will be described below. FIG. 9 is a function block diagram illustrating the configuration of the communication terminal according to the second embodiment. In FIG. 9, the blocks having the functions equivalent to FIG. 3 are indicated with the similar numerals, and description of the similar processing is omitted. As illustrated in FIG. 9, the communication terminal 200 includes a code presence/absence determining unit 210 and an action performing unit 211 in addition to the units illustrated in FIG. 3.

When the PG determining unit 107 determines that the neighbor base station belongs to the same PG as the HO source base station 10$a$, the PG determining unit 107 outputs the P signal, which is received from the neighbor base station that is determined to belong to the same PG as the HO source base station 10$a$, to the code presence/absence determining unit 210.

The code presence/absence determining unit 210 receives, from the PG determining unit 107, the P signal received from the neighbor base station that is determined to belong to the same PG as the HO source base station 10$a$. The code presence/absence determining unit 210 determines whether the P signal, which is received from the neighbor base station that is determined to belong to the same PG as the HO source base station 10$a$, includes the action code addressed to the communication terminal 200 in addition to the PG-ID.

An example in which the code presence/absence determining unit 210 determines whether the P signal includes the action code addressed to the communication terminal 200 will be described below. The code presence/absence determining unit 210 extracts a hash value (MS MAC Address Hash from the P signal received from the neighbor base station that is determined to belong to the same PG as the HO source base station 10$a$. The code presence/absence determining unit 210 inputs a Media Access Control (MAC) address of the communication terminal 200 in the following expression (1) and obtains the value of the low 24 bits of the obtained g (X).

$$g(X)=X^{24}+X^{23}+X^{18}+X^{17}+X^{14}+X^{11}+X^{10}+X^{7}+X^{6}+X^{5}+X^{4}+X^{3}+X+1 \quad (1)$$

X: MAC address

The code presence/absence determining unit 210 determines whether the hash value corresponds to the value of the low 24 bits of g (X). If the MS MAC Address Hash corresponds to the value of the low 24 bits of g (X), the code presence/absence determining unit 210 determines that the P signal includes the action code addressed to the communication terminal 200.

The code presence/absence determining unit 210 outputs the action code addressed to the communication terminal 200 that is determined to be included in the P signal, that is, the action code following the MS MAC Address Hash in the P signal to the action performing unit 211.

The action performing unit 211 receives the action code from the code presence/absence determining unit 210. The action performing unit 211 performs a prescribed action based on the action code.

FIG. 10 is a diagram illustrating an example of contents of the action code. As illustrated in FIG. 10, when the action code indicates "0b00," the action performing unit 211 performs an action for maintaining the intermittent reception without making action with respect to the neighbor base station. When the action code indicates "0b01," the action performing unit 211 performs ranging processing with respect to the neighbor base station. When the action code indicates "0b10," the action performing unit 211 temporarily stops the intermittent reception and performs confirming processing of downstream data such as mail data with respect to the neighbor base station.

Figure 11:
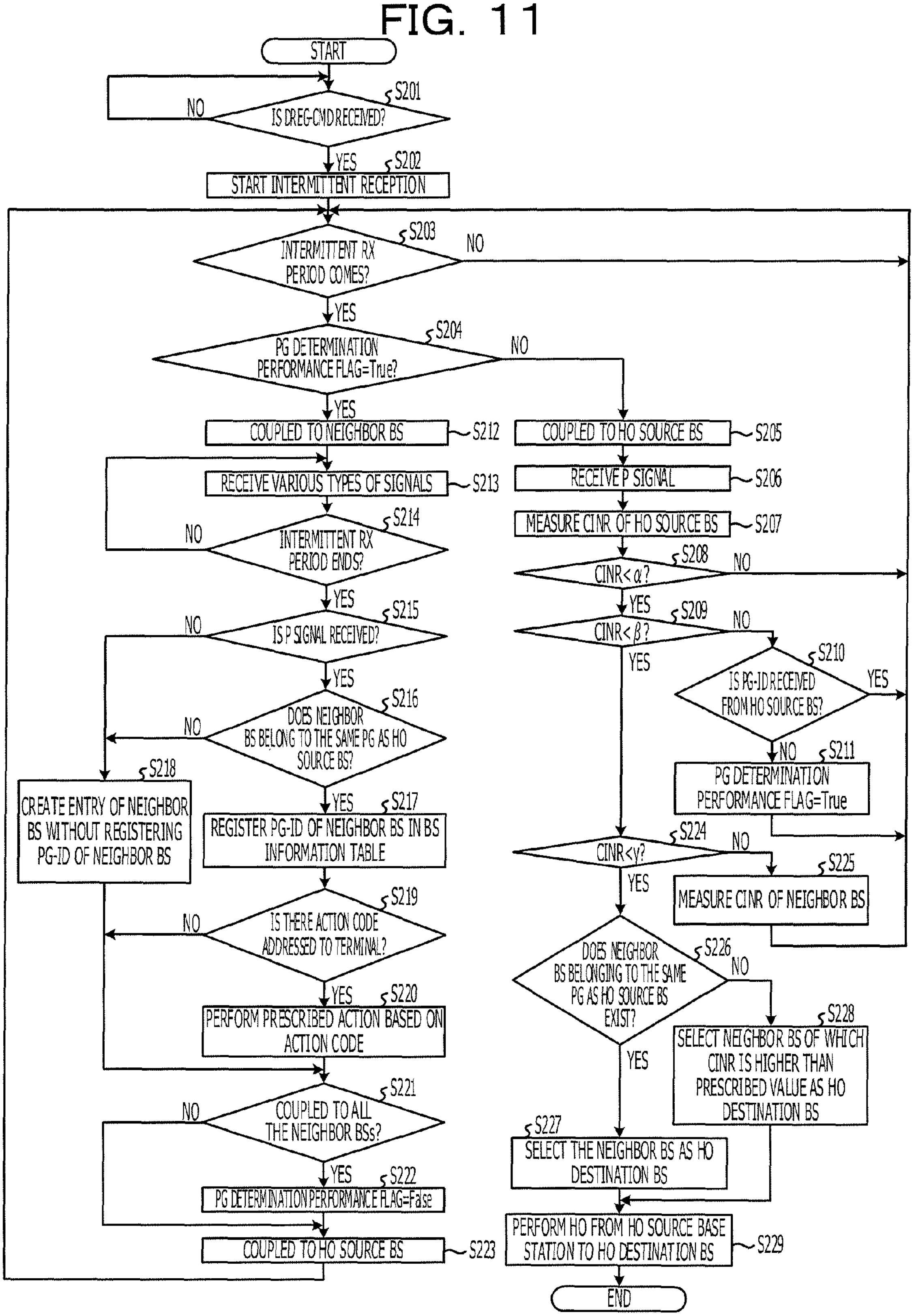
FIG. 11 is a flowchart illustrating of a processing procedure by the communication terminal according to the second embodiment.

With reference to FIG. 11, a processing procedure by the communication terminal 200 according to the second embodiment will be described below. FIG. 11 is a flowchart illustrating of the processing procedure by the communication terminal according to the second embodiment. The processing illustrated in FIG. 11 is performed at a time of receiving the DREG-CMD from the HO source base station 10*a*. In FIG. 11, Operations S201 to S218 and Operations S221 to S229 correspond to Operations S101 to S118 and Operations S119 to S127 illustrated in FIG. 8, so that detailed description thereof is omitted.

As illustrated in FIG. 11, if the neighbor base station belongs to the same PG as the HO source base station (YES in Operation S216), the communication terminal 200 performs the following processing. That is, the communication terminal 200 determines whether the P signal, which is received from the neighbor base station that is determined to belong to the same PG as the HO source base station, includes the action code addressed to the communication terminal 200 (Operation S219). If the P signal includes the action code addressed to the communication terminal 200 (YES in Operation S219), the communication terminal 200 performs a prescribed action based on the action code included in the P signal (Operation S220). The process goes to Operation S221. If the P signal does not include the action code addressed to the communication terminal 200 (NO in Operation S219), the communication terminal 200 proceeds the processing to Operation S221.

As described above, according to the second embodiment, the code presence/absence determining unit 210 of the communication terminal 200 determines whether the P signal received from the neighbor base station that is determined to belong to the same PG as the HO source base station 10*a* includes the action code addressed to the communication terminal 200 in addition to the PG-ID. The action performing unit 211 performs a prescribed action based on the action code determined to be included in the P signal. Therefore, according to the second embodiment, the communication terminal 200 may properly perform a preparation action to receive the downstream data from the neighbor base station before the handover and also may reduce the action performed after the handover. As a result, the communication terminal 200 according to the second embodiment may further reduce the power consumption caused by the handover.

Third Embodiment

The first embodiment has described the example in which the communication terminal is sequentially coupled to the neighbor base stations and in which the CINR of each neighbor base station is not measured when the PG determining unit 107 performs the determining processing. A third embodiment will describe an example in which, before the PG determining unit 107 performs the determining processing, the CINR of each neighbor base station is measured, and in which the communication terminal is sequentially coupled to the neighbor base stations in descending order of the CINR during the intermittent reception period.

Figure 12:
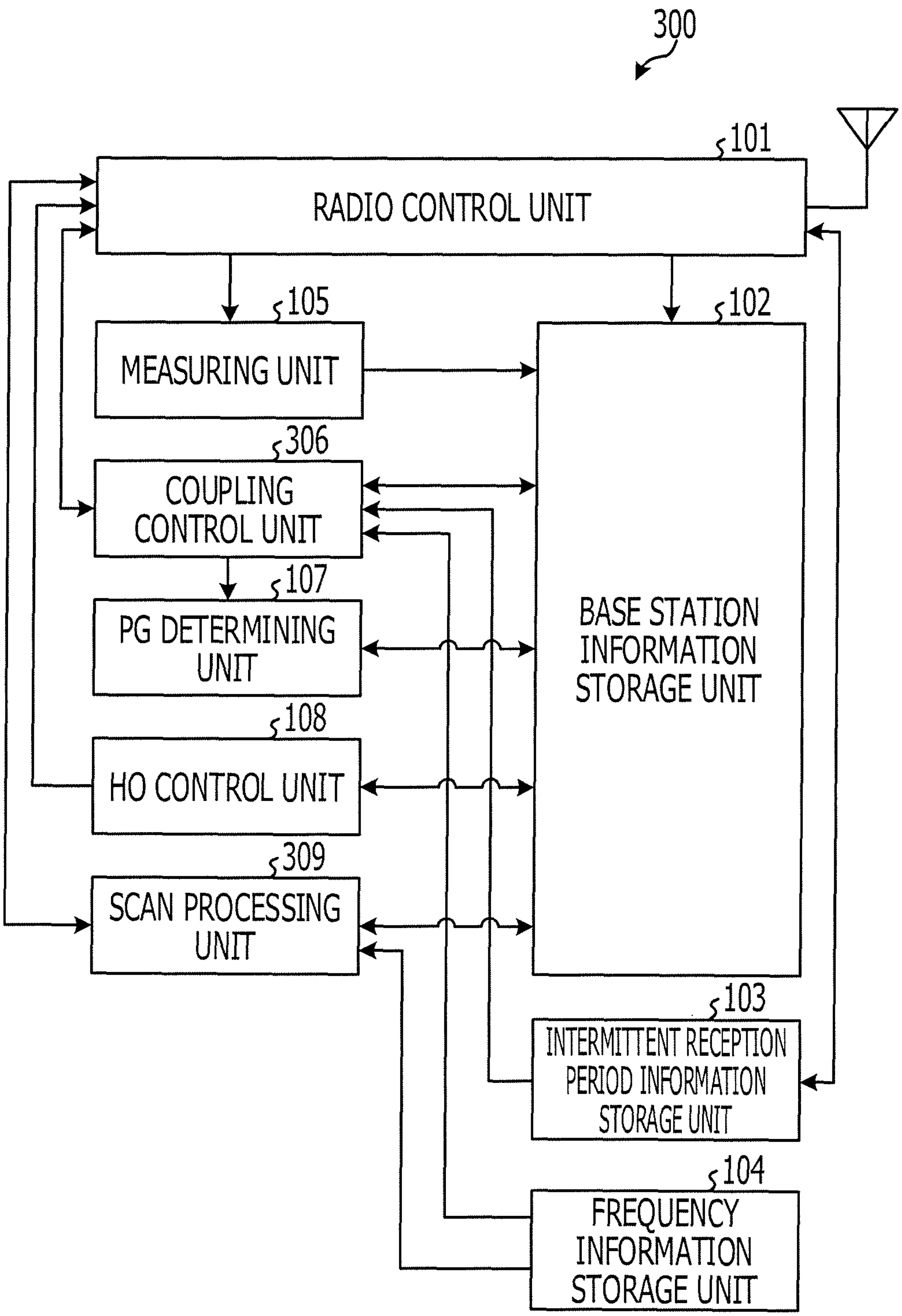
FIG. 12 is a function block diagram illustrating a configuration of a communication terminal according to a third embodiment.

With reference to FIG. 12, a configuration of a communication terminal 300 according to the third embodiment will be described below. FIG. 12 is a function block diagram illustrating the configuration of the communication terminal according to the third embodiment. In FIG. 12, the blocks having the functions equivalent to FIG. 3 are indicated with the similar numerals, and description of the similar processing is omitted. As illustrated in FIG. 12, the communication terminal 300 includes a scan processing unit 309 instead of the scan processing unit 109 illustrated in FIG. 3. The communication terminal 300 includes a coupling control unit 306 instead of the coupling control unit 106 illustrated in FIG. 3.

The scan processing unit 309 measures the CINR of each neighbor base station before the PG determining unit 107 performs the determining processing. Specifically, the scan processing unit 309 references to the base station information storage unit 102 to determine whether the CINR of the HO source base station 10*a* is lower than the threshold value β. According to the third embodiment, the threshold value β is higher than the threshold value α used by the coupling control unit 306 to be sequentially coupled to the neighbor base stations during the intermittent reception period. If the CINR of the HO source base station 10*a* is lower than the threshold value β, the scan processing unit 309 obtains, from the frequency information storage unit 104, the frequency used for the radio communication between the communication terminal 300 and the neighbor base station. By setting the frequency obtained from the frequency information storage unit 104 to the radio control unit 101, the scan processing unit 309 is coupled to the neighbor base station during the intermittent reception period to measure the CINR of the coupled neighbor base station. The scan processing unit 309 associates and registers the measured CINR of the neighbor base station and the BS-ID of the neighbor base station in the base station information storage unit 102.

The coupling control unit 306 performs processing corresponding to the coupling control unit 106 illustrated in FIG. 3. The coupling control unit 306 is different from the coupling control unit 106 in that the coupling control unit 306 performs the following processing. That is, the coupling control unit 306 is sequentially coupled to the neighbor base stations during the intermittent reception period in descending order of the CINR (hereinafter, referred to as "CINR order") from the best CINR to the worst CINR measured by the scan processing unit 309. The coupling control unit 306 stops being coupled to an neighbor base station other than the neighbor base station that is determined by the PG determining unit 107 to belong to the same PG as the HO source base station 10*a* among the neighbor base stations.

Specifically, when the intermittent reception period comes, the coupling control unit 306 references to the base station information storage unit 102 to search the neighbor base station of which the CINR is highest. According to the third embodiment, the coupling control unit 306 references to the base station information storage unit 102 illustrated in FIG. 4 to search the base station 10*b* with the highest CINR. The coupling control unit 306 obtains, from the frequency information storage unit 104, the frequency used for the radio communication between the communication terminal 300 and the base station 10*b* with the highest CINR. By setting the frequency obtained from the frequency information storage unit 104 to the radio control unit 101, the coupling control unit 306 is coupled to the base station 10*b* with the highest CINR. The coupling control unit 306 stops being coupled to an neighbor base station other than the neighbor base station that is determined by the PG determining unit 107 to belong to the same PG as the HO source base station 10*a* among the neighbor base stations.

Figure 13:
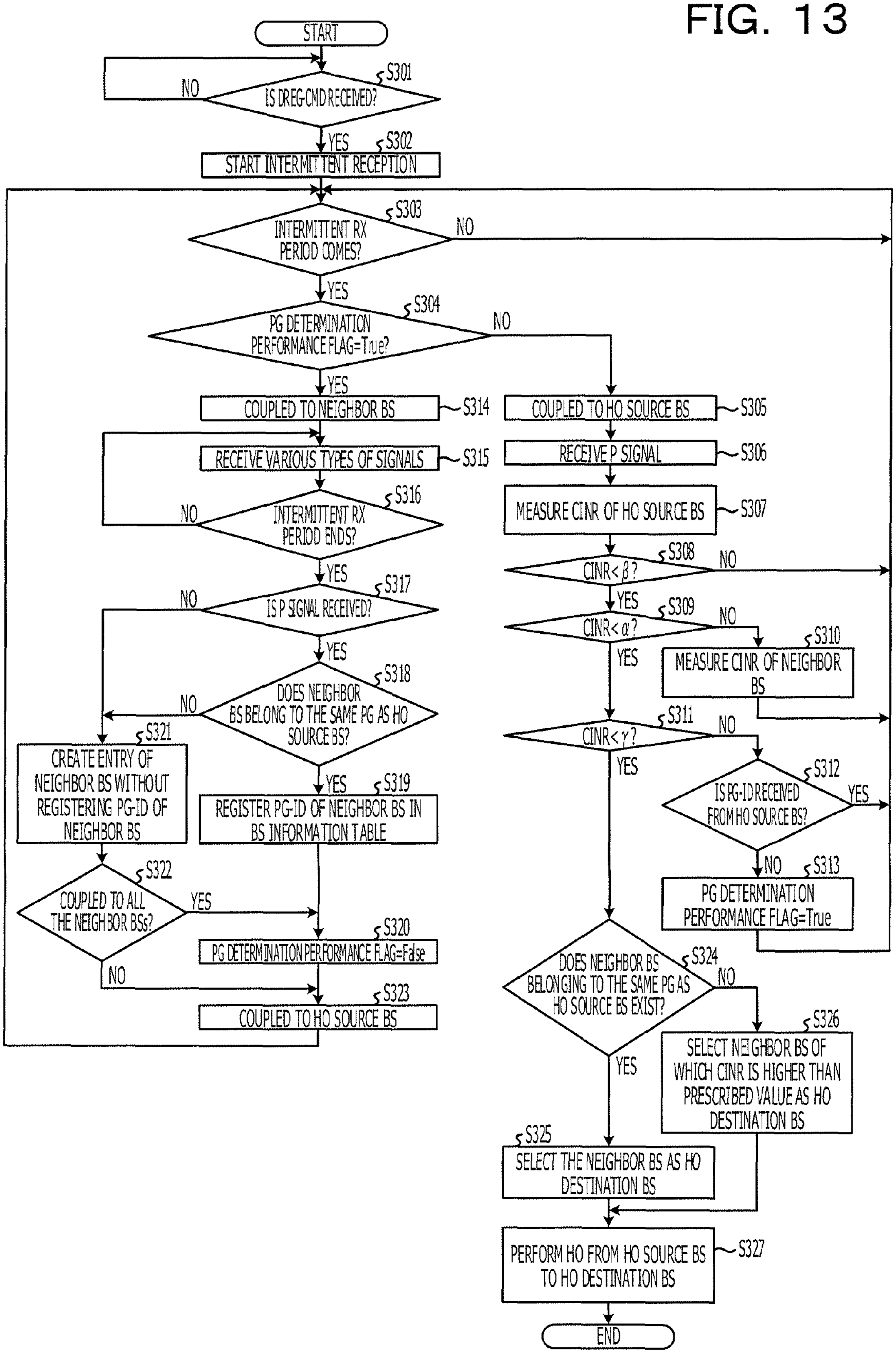
FIG. 13 is a flowchart illustrating a processing procedure by the communication terminal according to the third embodiment.

With reference to FIG. 13, a processing procedure by the communication terminal 300 according to the third embodiment will be described below. FIG. 13 is a flowchart illustrating the processing procedure by the communication terminal according to the third embodiment. The processing illustrated in FIG. 13 is performed at a time of receiving the DREG-CMD from the HO source base station 10*a*. In FIG. 13, Operations S301 to S307, Operations S315 to Operations S318, Operation S323, and Operations S324 to S327 correspond to Operations S101 to S107, Operations S113 to Operations S116, Operation S121, and Operations S124 to S127 illustrated in FIG. 8, so that detailed description thereof is omitted.

As illustrated in FIG. 13, the communication terminal 300 determines whether the CINR of the HO source base station 10*a* is lower than the threshold value β (>α) (Operation S308). If the CINR of the HO source base station 10*a* is equal to or higher than the threshold value β (NO in Operation S308), the communication terminal 300 is in the sleep state. The process goes back to Operation S303.

If the CINR of the HO source base station 10*a* is lower than the threshold value β (YES in Operation S308), the communication terminal 300 determines whether the CINR of the HO source base station 10*a* is lower than the threshold value α (Operation S309). If the CINR of the HO source base station 10*a* is equal to or higher than the threshold value α (NO in Operation S309), the communication terminal 300 measures the CINR of the neighbor base station (Operation S310) to be in the sleep state. The process goes back to Operation S303. That is, the communication terminal 300 measures the CINR of each neighbor base station before the PG determining unit 107 performs the determining processing.

If the CINR of the HO source base station 10*a* is lower than the threshold value α (YES in Operation S308), the communication terminal 300 determines whether the CINR of the HO source base station 10*a* is lower than the threshold value γ (<α) (Operation S311). If the CINR of the HO source base station 10*a* is equal to or higher than the threshold value γ (NO in Operation S311), the communication terminal 300 references to the base station information storage unit 102 to determine whether the PG-ID of each neighbor base station is received from the HO source base station 10*a* (Operation S312).

If the PG-ID of each neighbor base station is received from the HO source base station 10*a* (YES in Operation S312), the communication terminal 300 is in the sleep state. The process goes back to Operation S303. If the PG-ID of each neighbor base station is not received from the HO source base station 10*a* (NO in Operation S312), the communication terminal 300 sets "True (performance desired)" to the PG determination performance flag (Operation S313). The process goes back to Operation S303.

If "True (performance desired)" is set to the PG determination performance flag (YES in Operation S304), the communication terminal 300 is coupled to the neighbor base stations in the CINR order (Operation S314).

If the neighbor base station belongs to the same PG as the HO source base station 10*a* (YES in Operation S318), the communication terminal 300 associates and registers the PG-ID of the neighbor base station included in the P signal and the BS-ID of the neighbor base station in the base station information storage unit 102 (Operation S319). Before being coupled to all the neighbor base stations, the communication terminal 300 sets "False (performance not desired)" to the PG determination performance flag (Operation S320). The process goes to Operation S323. The communication terminal 300 stops being coupled to an neighbor base station other than the neighbor base station that is determined to belong to the same PG as the HO source base station 10*a* among the neighbor base stations.

If the neighbor base station belongs to a PG that is different from the PG of the HO source base station 10*a* (NO in Operation S318), the communication terminal 300 registers simply the BS-ID of the neighbor base station in the base station information storage unit 102 without registering the PG-ID of the neighbor base station (Operation S321). If the communication terminal 300 is coupled to all the neighbor base stations (YES in Operation S322), the communication terminal 300 proceeds the processing to Operation S320. If the communication terminal 300 is not coupled to all the neighbor base stations (NO in Operation S322), the communication terminal 300 proceeds the processing to Operation S323.

As described above, according to the third embodiment, the scan processing unit 309 of the communication terminal 300 measures the CINR of each neighbor base station before the PG determining unit 107 performs the determining processing. The coupling control unit 306 is sequentially coupled to the neighbor base stations during the intermittent reception period in the CINR order. The coupling control unit 306 stops being coupled to an neighbor base station other than the neighbor base station that is determined by the PG determining unit 107 to belong to the same PG as the HO source base station 10*a* among the neighbor base stations. Due to this, the neighbor base station that is determined to belong to the same PG as the HO source base station 10*a* has the highest CINR, the communication terminal 300 may prevent from being coupled wastefully to an neighbor base station other than the neighbor station with the highest CINR. As a result, the communication terminal 300 according to the third embodiment may further reduce the power consumption caused by the handover.

Fourth Embodiment

The first embodiment has described the example in which the intermittent reception period included in the DREG-CMD received from the HO source base station is registered in the intermittent reception period information storage unit 103 and in which the communication terminal is sequentially coupled to the neighbor base stations during the intermittent reception period. However, when transmitting the P signal to another communication terminal that is different from the communication terminal during another transmission period that is different from the transmission period in which the HO source base station transmits the P signal to the communication terminal, the communication terminal is able to obtain the other transmission period as another intermittent reception period. A fourth embodiment will describe an example of being coupled to the neighbor base stations during the other intermittent reception period as well as the intermittent reception period.

Figure 14:
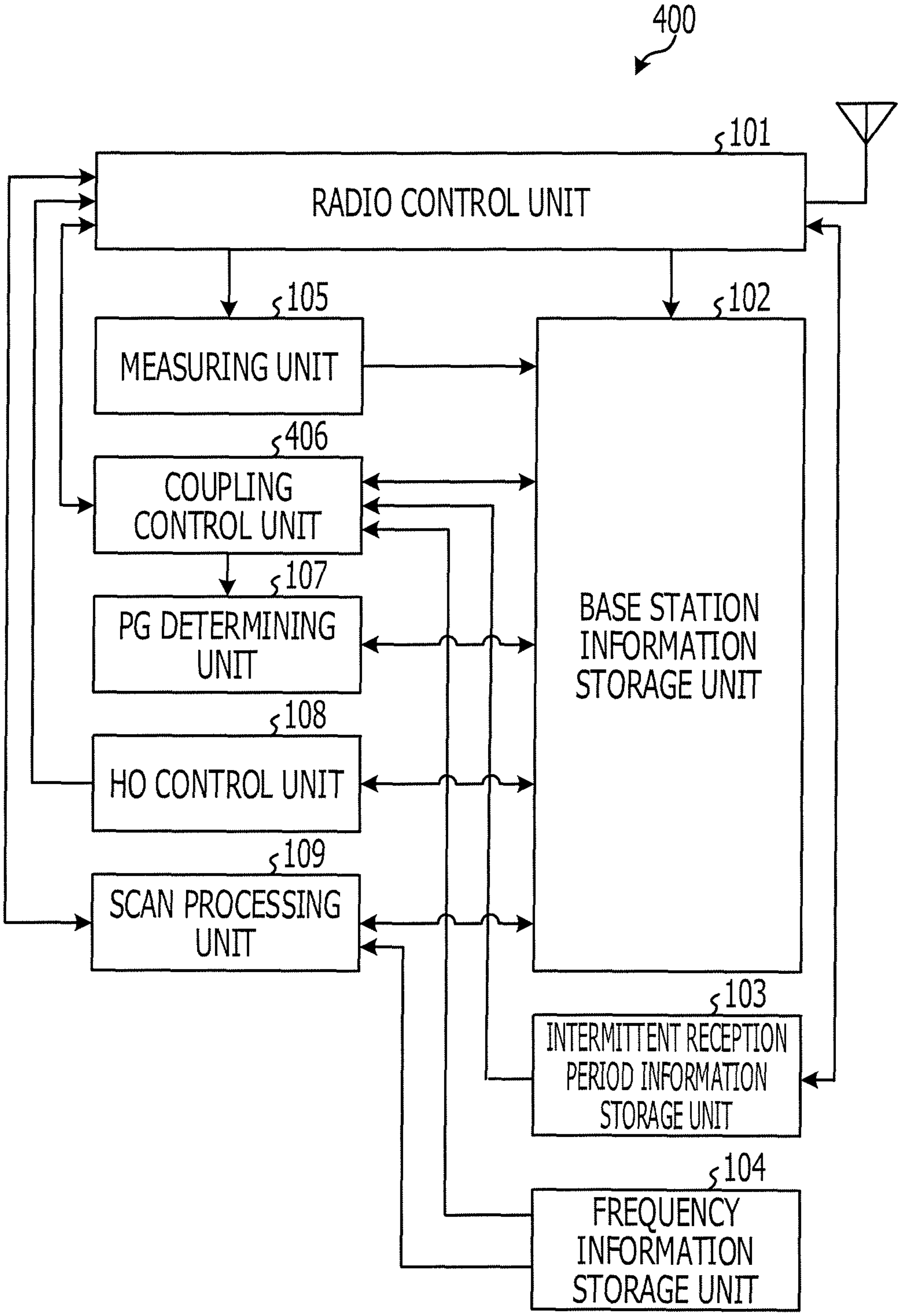
FIG. 14 is a function block diagram illustrating a configuration of a communication terminal according to a fourth embodiment.

With reference to FIG. 14, a configuration of a communication terminal 400 according to the fourth embodiment will be described below. FIG. 14 is a function block diagram illustrating the configuration of the communication terminal according to the fourth embodiment. In FIG. 14, the blocks having the functions equivalent to FIG. 3 are indicated with the similar numerals, and description of the similar processing is omitted. As illustrated in FIG. 14, the communication terminal 400 includes a coupling control unit 406 instead of the coupling control unit 106 illustrated in FIG. 3. According to the fourth embodiment, the HO source base station 10*a* illustrated in FIG. 1 transmits the P signal to another communication terminal (not illustrated) different from the communication terminal 400 during another transmission period (hereinafter, referred to as "the other transmission period of the P signal") that is different from the transmission period in which the P signal is transmitted to the communication terminal 400.

The coupling control unit 406 receives the P signal received from the HO source base station 10*a* from the radio control unit 101 during the period in which the radio control unit 101 receives the DREG-CMD. The coupling control unit 406 holds a reception history of the P signal received from the HO source base station 10*a*. An example of the reception history of the P signal held by the coupling control unit 406 is illustrated in FIG. 15. FIG. 15 is a diagram illustrating an example of the reception history of the P signal. As illustrated in FIG. 15, the coupling control unit 406 holds the frame number of the P signal received from the he HO source base station 10*a* as the reception history of the P signal.

Based on the reception history of the P signal held by the coupling control unit 406 and on the intermittent reception period registered by the radio control unit 101 in the intermittent reception period information storage unit 103, the coupling control unit 406 obtains the other transmission period of the P signal as another intermittent reception period that is different from the intermittent reception period.

Figure 16:
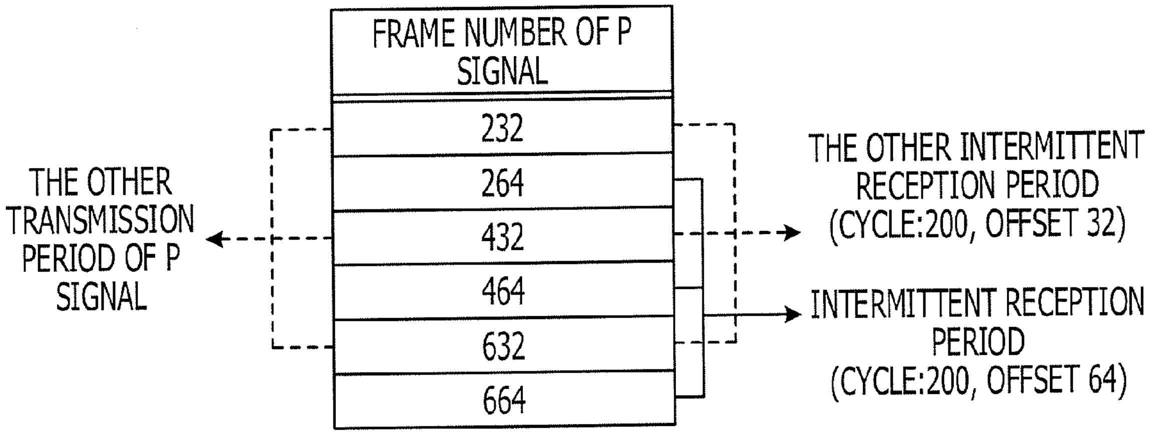
FIG. 16 is a diagram illustrating an example of processing in which a coupling control unit according to the fourth embodiment obtains another intermittent reception period.

An example of the processing by the coupling control unit 406 for obtaining the other intermittent reception period will be described below. FIG. 16 is a diagram illustrating an example of processing in which the coupling control unit according to the fourth embodiment obtains the other intermittent reception period. As illustrated in FIG. 16, the intermittent reception period stored in the intermittent reception period information storage unit 103 is illustrated in FIG. 5. As illustrated in FIG. 16, based on the frame number of the P signal as the reception history of the P signal and on the intermittent reception period stored in the intermittent reception period information storage unit 103, the coupling control unit 406 obtains the other transmission period of the P signal as another intermittent reception period that is different from the intermittent reception period. For example, the coupling control unit 406 compares the frame numbers "264," "464," and "664," the cycle "200," and the offset "64" of the intermittent reception period stored in the intermittent reception period information storage unit 103. Based on the comparison result, the coupling control unit 406 obtains the cycle "200" and the offset "32" of the other intermittent reception period.

The coupling control unit 406 registers the obtained other intermittent reception period in the intermittent reception period information storage unit 103 separately from the intermittent reception period. For example, the coupling control unit 406 registers the cycle "200" and the offset "32" of the obtained other intermittent reception period obtained in the example in FIG. 16 in the intermittent reception period information storage unit 103 separately from the information (the information in the first row) of the intermittent reception period of the DREG-CMD as illustrated in FIG. 17. FIG. 17 is a diagram illustrating an example of the other intermittent reception period stored in the intermittent reception period information storage unit. In FIG. 17, the information of the PG-ID and the intermittent reception period is common between the other intermittent reception period and the intermittent reception period of the DREG-CMD.

The coupling control unit 406 references to the base station information storage unit 102 to determine whether the CINR of the HO source base station 10*a* is lower than the threshold value α. The coupling control unit 406 references to the base station information storage unit 102 to determine whether the PG-ID of each of the base station 10*b* and the base station 10*c* that are neighbor to the HO source base station 10*a* is received from the HO source base station 10*a*. In other words, the coupling control unit 406 determines whether the PG-ID of each of the base station 10*b* and the base station 10*c* as the neighbor base station is registered in the base station information storage unit 102. When the CINR of the HO source base station 10*a* is lower than the threshold value α and when the PG-ID of each of the base station 10*a* and the base station 10*c* as the neighbor base station is not received from the HO source base station 10*a*, the coupling control unit 406 references to the intermittent reception period information storage unit 103. The coupling control unit 406 is sequentially coupled to the neighbor base stations during the intermittent reception period or the other intermittent reception period stored in the intermittent reception period information storage unit 103.

Specifically, when the intermittent reception period or the other intermittent reception period comes, the coupling control unit 406 obtains, from the frequency information storage unit 104, the frequency used for the radio communication between the communication terminal 400 and the base station 10*b*. By setting the frequency obtained from the frequency information storage unit 104 to the radio control unit 101, the coupling control unit 406 is coupled to the base station 10*b* as the neighbor base station. When the intermittent reception period or the other intermittent reception period comes again, the coupling control unit 406 obtains, from the frequency information storage unit 104, the frequency used for the radio communication between the communication terminal 400 and the base station 10*c*. By setting the frequency obtained from the frequency information storage unit 104 to the radio control unit 101, the coupling control unit 406 is coupled to the base station 10*c* as the neighbor base station.

Figure 18A:
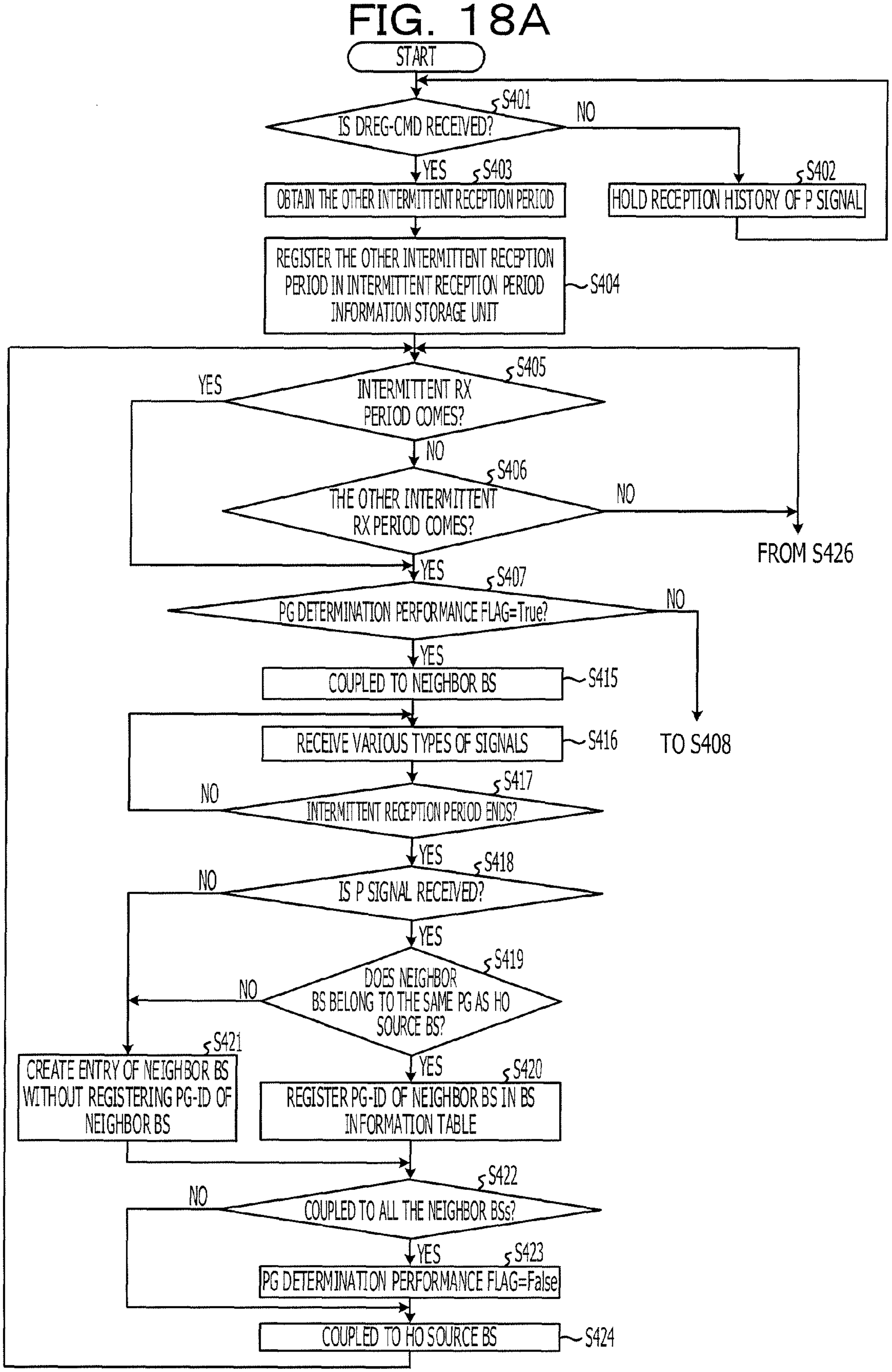
FIGS. 18A and 18B are flowcharts illustrating a processing procedure by the communication terminal according to the fourth embodiment.
Figure 18B:
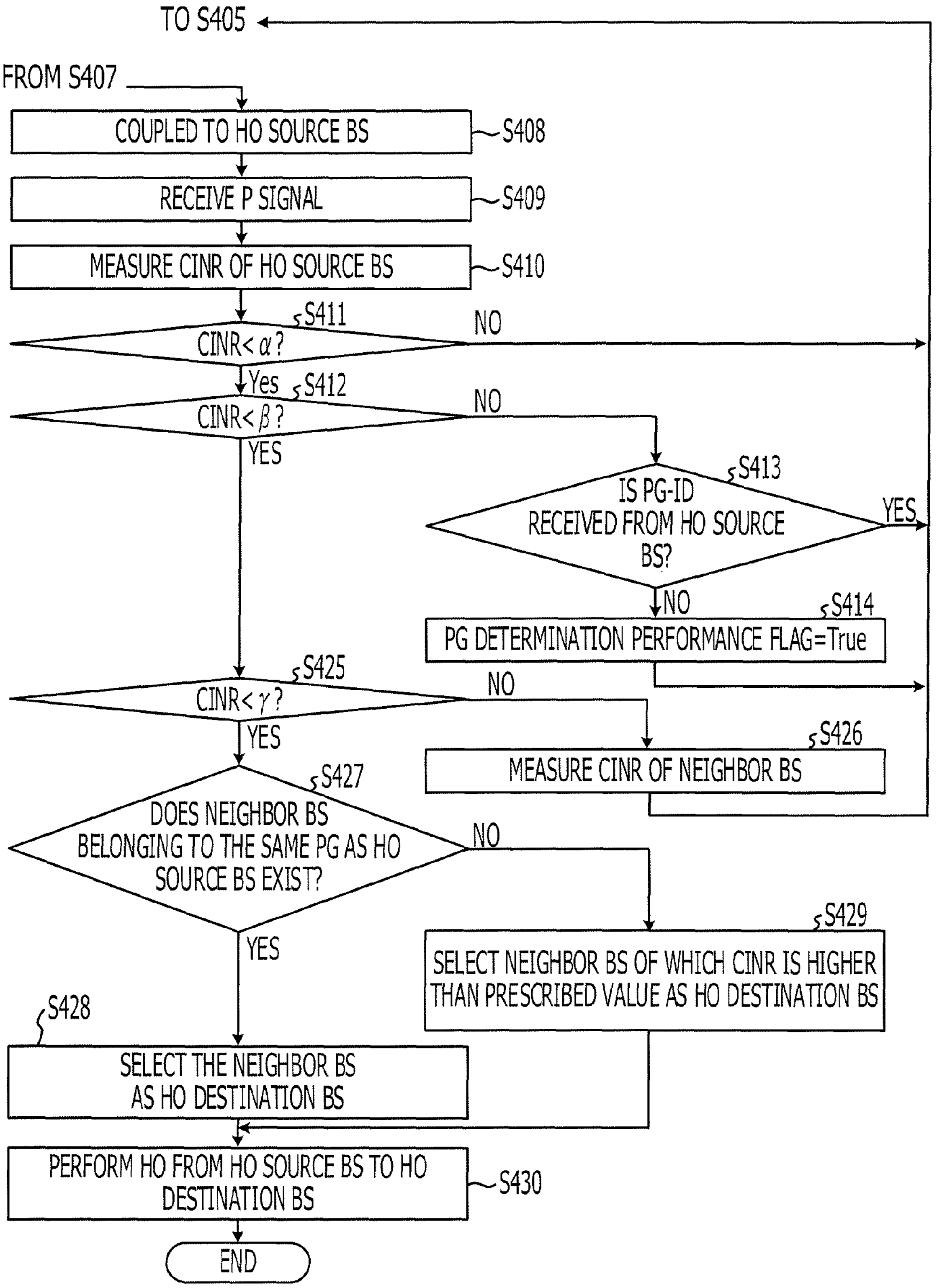

With reference to FIGS. 18A and 18B, a processing procedure by the communication terminal 400 according to the fourth embodiment will be described below. FIGS. 18A and 18B are flowcharts illustrating the processing procedure by the communication terminal according to the fourth embodiment. The processing illustrated in FIGS. 18A and 18B is performed at a time of receiving the DREG-CMD from the HO source base station 10*a*. In FIGS. 18A and 18B, Operations S407 to S430 correspond to Operations S104 to S127 illustrated in FIG. 8, so that detailed description thereof is omitted. In this case, the HO source base station 10*a* transmits the P signal to another communication terminal that is different from the communication terminal 400 during a transmission period that is different from the transmission period in which the P signal is transmitted to the communication terminal 400.

As illustrated in FIGS. 18A and 18B, if the communication terminal 400 does not receive the DREG-CMD from the HO source base station 10*a* (NO in Operation S401), the communication terminal 400 holds the reception history of the P signal (Operation S402). The process goes back to Operation S401.

If the communication terminal 400 receives the DREG-CMD from the HO source base station 10*a* (YES in Operation S401), the communication terminal 400 registers the intermittent reception period included in the DREG-CMD in the intermittent reception period information storage unit 103. Based on the reception history of the P signal held by the communication terminal 400 and on the intermittent reception period registered in the intermittent reception period information storage unit 103, the communication terminal 400 obtains another intermittent reception period that is different from the intermittent reception period (Operation S403). The communication terminal 400 registers the obtained other intermittent reception period separately from the intermittent reception period in the intermittent reception period information storage unit 103 (Operation S404).

When neither the intermittent reception period nor the other intermittent reception period stored in the intermittent reception period information storage unit 103 comes (NO in Operation S405, NO in Operation S406), the communication terminal 400 is in the sleep state. The process goes back to Operation S405. When one of the intermittent reception period and the other intermittent reception period comes (YES in Operation S406 or NO in Operation S405 and YES in Operation S406), the communication terminal 400 is in the awake state. The communication terminal 400 performs the following processing. The communication terminal 400 determines whether "True (performance desired)" is set to the PG determination performance flag indicating whether the determining processing by the PG determining unit 107 is desired (Operation S407). When "False (performance not desired)" is set to the PG determination performance flag (NO in Operation S407), the communication terminal 400 proceeds the processing to Operation S408.

When "True (performance desired)" is set to the PG determination performance flag (YES in Operation S407), the communication terminal 400 is coupled to one of the base stations 10*b* and 10*c* as the neighbor base station (Operation S415). That is, when the CINR of the HO source base station 10*a* is lower than the threshold value α and when the PG-ID of each neighbor base station is not received from the HO source base station 10*a*, the communication terminal 400 is sequentially coupled to the neighbor base stations during the intermittent reception period or the other intermittent reception period.

As described above, according to the fourth embodiment, based on the reception history of the P signal and on the intermittent reception period stored in the intermittent reception period information storage unit 103, the coupling control unit 406 of the communication terminal 400 obtains the other transmission period of the P signal of the HO source base station 10*a* as the other intermittent reception period. The coupling control unit 406 registers the obtained other intermittent reception period separately from the intermittent reception period in the intermittent reception period information storage unit 103. When the CINR of the HO source base station 10*a* is lower than the threshold value and when the PG-ID of each neighbor base station is not received from the HO source base station 10*a*, the coupling control unit 406 is sequentially coupled to the neighbor base stations during the intermittent reception period or the other intermittent reception period. Therefore, even when the P signal is transmitted to a communication terminal that is different from the communication terminal 400 during the transmission period that is different from the transmission period in which the HO source base station 10*a* transmits the P signal to the communication terminal 400, the communication terminal 400 may reduce the power consumption caused by the handover.

Fifth Embodiment

The fourth embodiment has described the example of the processing for sequentially being coupled to the neighbor base stations during the intermittent reception period or the other intermittent reception period and of independent processing for measuring the CINR of each neighbor base station. A fifth embodiment will describe the example of measuring the CINR of the neighbor base station during the intermittent reception period or the other intermittent reception period.

Figure 19:
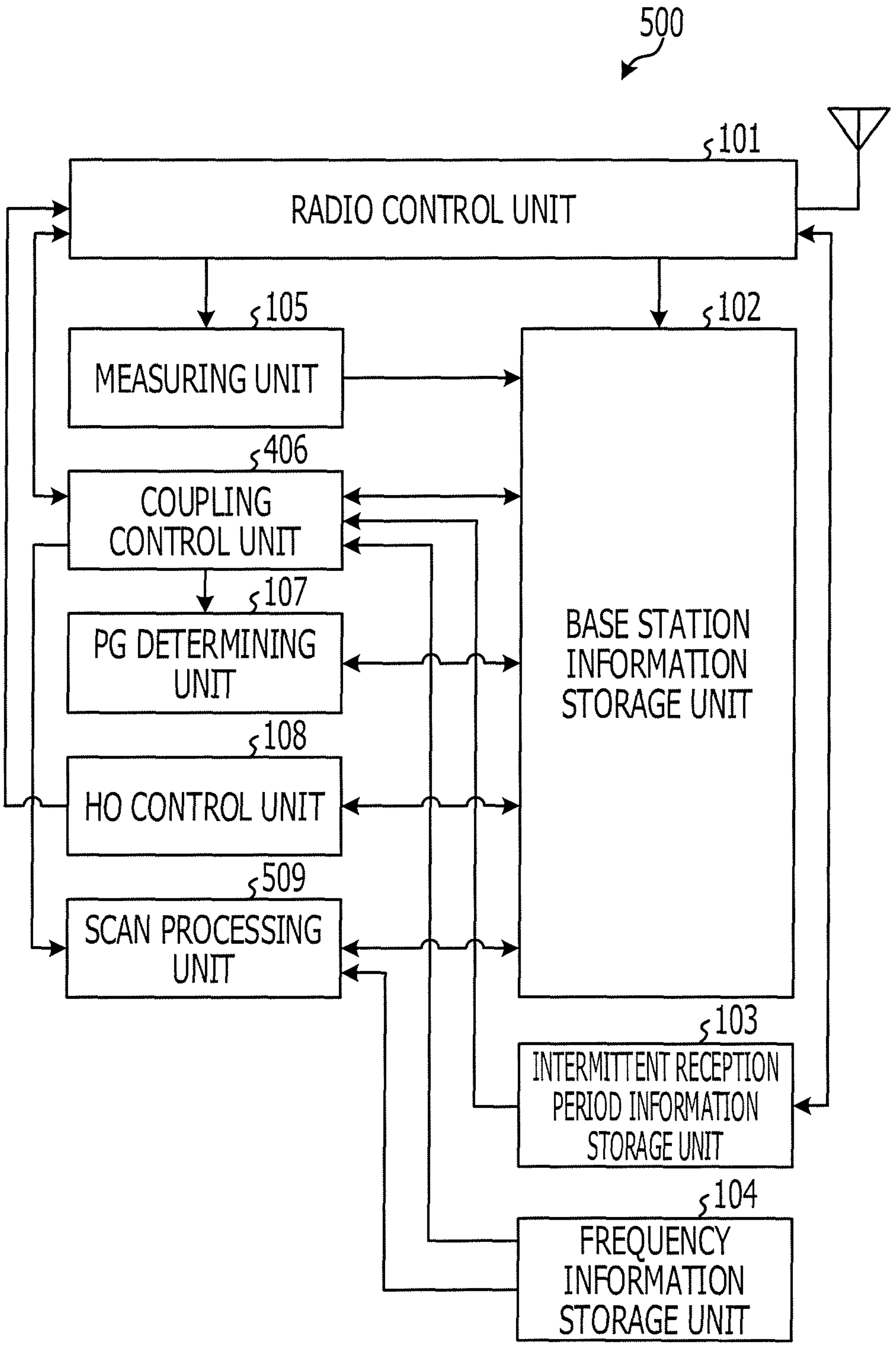
FIG. 19 is a function block diagram illustrating a configuration of a communication terminal according to a fifth embodiment.

With reference to FIG. 19, a configuration of a communication terminal 500 according to the fifth embodiment will be described below. FIG. 19 is a function block diagram illustrating the configuration of the communication terminal according to the fifth embodiment. In FIG. 19, the blocks having the functions equivalent to FIG. 14 are indicated with the similar numerals, and description of the similar processing is omitted. As illustrated in FIG. 19, the communication terminal 500 includes a scan processing unit 509 instead of the scan processing unit 109 illustrated in FIG. 14.

The scan processing unit 509 measures the CINR of the neighbor base station that is coupled by the coupling control unit 406 during the intermittent reception period or the other intermittent reception period. Specifically, the scan processing unit 509 references to the base station information storage unit 102 to determine whether the CINR of the HO source base station 10*a* is lower than the threshold value β. If the CINR of the HO source base station 10*a* is lower than the threshold value β, the scan processing unit 509 determines to perform scan processing for measuring the CINR of the neighbor base station and monitors whether the coupling control unit 406 is coupled to the neighbor base station during the intermittent reception period or the other intermittent reception period. When detecting that the coupling control unit 406 is coupled to the neighbor base station during the intermittent reception period or the other intermittent reception period, the scan processing unit 509 measures the CINR of the neighbor base station that is coupled by the coupling control unit 406 during the intermittent reception period or the other intermittent reception period.

Figure 20A:
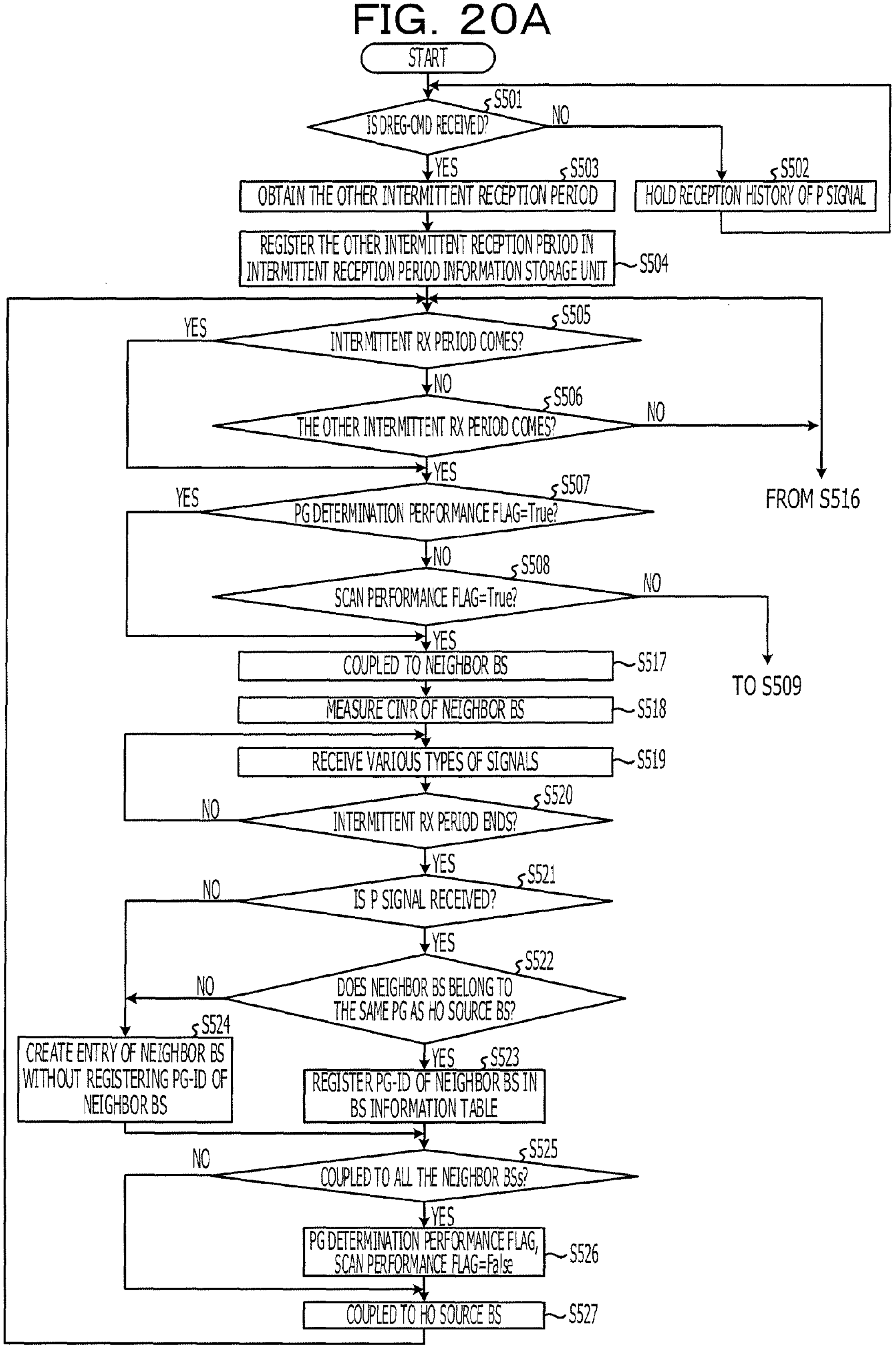
FIGS. 20A and 20B are flowcharts illustrating a processing procedure by the communication terminal according to the fifth embodiment.
Figure 20B:
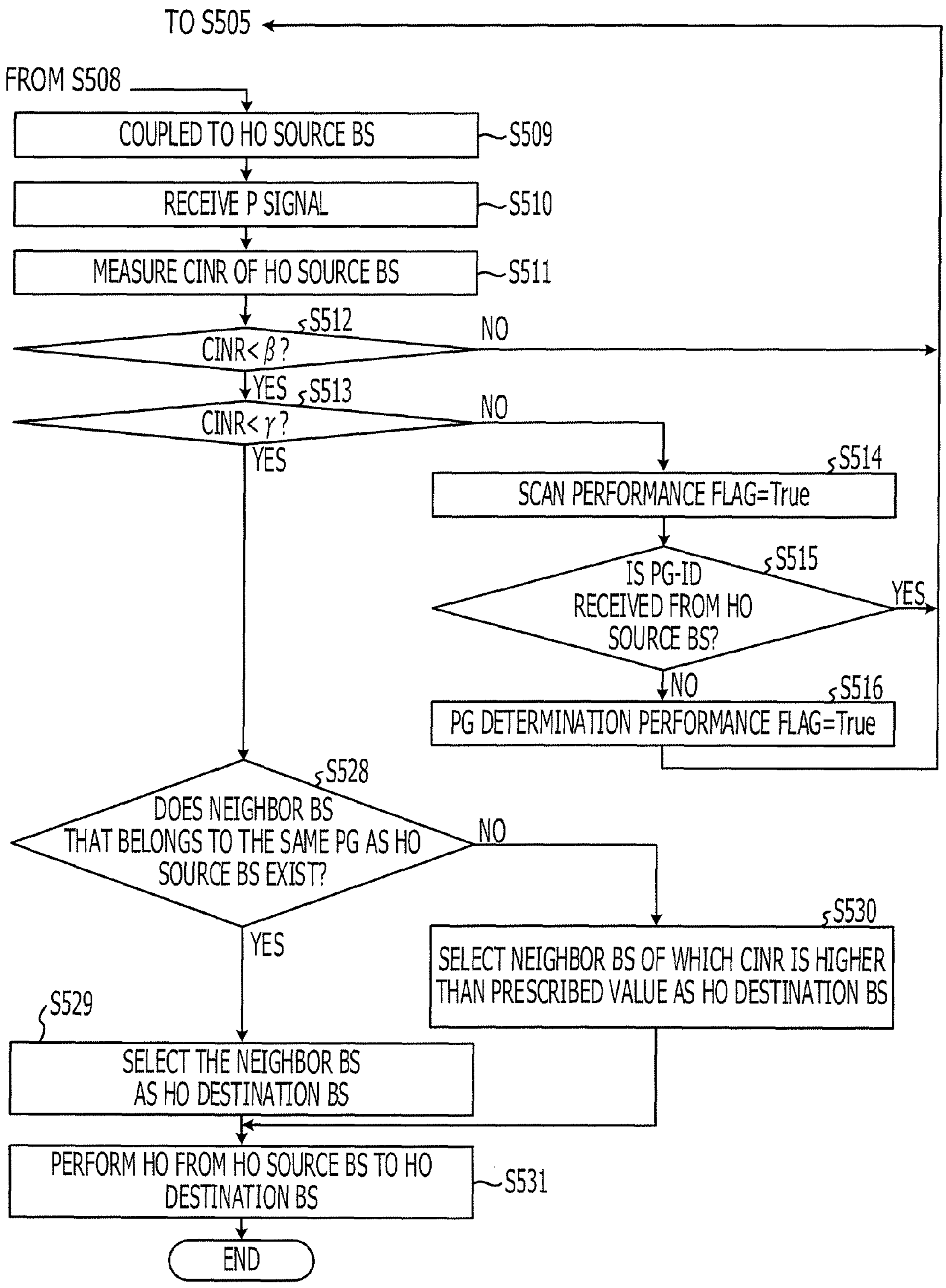

With reference to FIGS. 20A and 20B, a processing procedure by the communication terminal 500 according to the fifth embodiment will be described below. FIGS. 20A and 20B are flowcharts illustrating the processing procedure by the communication terminal according to the fifth embodiment. The processing illustrated in FIGS. 20A and 20B is performed at a time of receiving the DREG-CMD from the HO source base station 10*a*. In FIGS. 20A and 20B, Operations S501 to S507 and Operations S509 to S511 correspond to Operations S401 to S407 and Operations S408 to 5410 illustrated in FIGS. 18A and 18B, so that detailed description thereof is omitted. Further, in FIGS. 20A and 20B, Operations S519 to S525, Operation S527, and Operations S528 to S531 correspond to Operations S416 to S422, Operation S424, and Operations S427 to S430 illustrated in FIGS. 18A and 18B, so that detailed description thereof is omitted. In this case, the HO source base station 10*a* transmits the P signal to another communication terminal that is different from the communication terminal 500 during another transmission period that is different from the transmission period in which the P signal is transmitted to the communication terminal 500.

As illustrated in FIGS. 20A and 20B, when "False (performance not desired)" is set to the PG determination performance flag (NO in Operation S507), the communication terminal 500 performs the following processing. That is, the communication terminal 500 determines whether "True (performance desired)" is set to a scan performance flag indicating whether the scan processing for measuring the CINR of the neighbor base station is desired (Operation S508).

If the "False (performance not desired)" is set to the scan performance flag (NO in Operation S508), the communication terminal 500 proceeds the processing to Operation S509. After that, the communication terminal 500 determines whether the CINR of the HO source base station 10*a* is lower than the threshold value β (Operation S512). If the CINR of the HO source base station 10*a* is equal to or higher than the threshold value β (NO in Operation S512), the communication terminal 500 is in the sleep state. The process goes back to Operation S505.

If the CINR of the HO source base station 10*a* is lower than the threshold value β (YES in Operation S512), the communication terminal 500 determines whether the CINR of the HO source base station 10*a* is lower than the threshold value γ (<β) (Operation S513). If the CINR of the HO source base station 10*a* is equal to or higher than the threshold value β (NO in Operation S512), the communication terminal 500 determines to perform the scan processing for measuring the CINR of the neighbor base station and sets "True (performance desired)" to the scan performance flag (Operation S514).

The communication terminal 500 references to the base station information storage unit 102 to determine whether the PG-ID of each neighbor base station is received from the HO source base station 10*a* (Operation S515). If the PG-ID of each neighbor base station is received from the HO source base station 10*a* (YES in Operation S515), the communication terminal 500 is in the sleep state. The process goes back to Operation S505.

If the PG-ID of each neighbor base station is not received from the HO source base station 10*a* (NO in Operation S515), the communication terminal 500 sets "True (performance desired)" to the PG determination performance flag (Operation S516). The process goes back to Operation S505. That is, when the PG-ID of each neighbor base station is not received from the HO source base station 10*a*, the communication terminal 500 transfers the processing to the processing (Operations S517 to S527) for sequentially being coupled to the neighbor base stations during the intermittent reception period or the other intermittent reception period.

When "True (performance desired)" is set to the PG determination performance flag or when "True (performance desired)" is set to the scan performance flag (YES in Operation S507, YES in Operation S508), the communication terminal 500 performs the following processing. That is, the communication terminal 500 is coupled to one of the base stations 10*b* and 10*c* as the neighbor base station (Operation S517). The communication terminal 500 is coupled to the neighbor base station during the intermittent reception period or the other intermittent reception period. The communication terminal 500 measures the CINR of the neighbor base station that is coupled during the intermittent reception period or the other intermittent reception period (Operation S518) and then proceeds the processing to Operation S519.

If the communication terminal 500 is coupled to all the neighbor base stations (YES in Operation S525), the communication terminal 500 sets "False (performance not desired)" to the PG determination performance flag and the scan performance flag (Operation S526) and then proceeds the processing to Operation S527.

As described above, according to the fifth embodiment, the scan processing unit 509 of the communication terminal 500 measures the CINR of the neighbor base station that is coupled by the coupling control unit 406 during intermittent reception period or the other intermittent reception period. Due to this, the communication terminal 500 may perform the processing for sequentially being coupled to the neighbor base stations during the intermittent reception period or the other intermittent reception period and the processing for measuring the CINR of each neighbor base station as a sequent processing, so that the entire processing may be efficient. As a result, the communication terminal 500 according to the fifth embodiment may further reduce the power consumption caused by the handover.

[Hardware Configuration]

Figure 21:
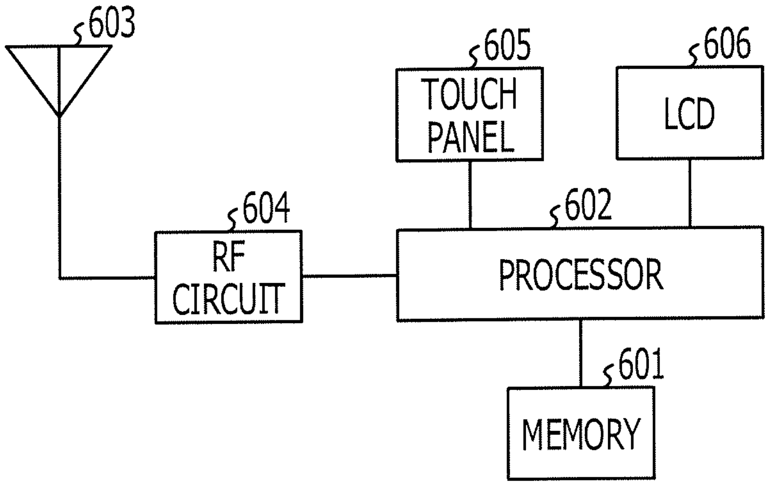
FIG. 21 is a hardware configuration diagram of the communication terminal.

With reference to FIG. 21, a hardware configuration of the communication terminal according to the first, second, third, fourth, and fifth embodiments will be described below. FIG. 21 is a hardware configuration diagram of the communication terminal.

As illustrated in FIG. 21, the communication terminal includes a memory 601, a processor 602, an antenna 603, a Radio Frequency (RF) circuit 604, a touch panel 605, and a Liquid Crystal Display (LCD) 606. The memory 601, the RF circuit 604, the touch panel 605, and the LCD 606 are each coupled to the processor 602. The antenna 603 is coupled to the RF circuit 604.

The memory 601 is a storage device. The memory 601 stores various types of programs that achieve the processing performed by the radio control unit 101, the measuring unit 105, the coupling control unit 106, the PG determining unit 107, the HO control unit 108, the scan processing unit 109, and the like. The memory 601 stores various types of programs that achieve the processing performed by the code presence/absence determining unit 210, the action performing unit 211, and the like illustrated in FIG. 9. The memory 601 stores various types of programs that achieve the processing performed by the coupling control unit 306, the scan processing unit 309, and the like illustrated in FIG. 12. The memory 601 stores various types of programs that achieve the processing performed by the coupling control unit 406 and the like illustrated in FIG. 14. The memory 601 stores various types of programs that achieve the processing performed by the scan processing unit 509 and the like illustrated in FIG. 19.

The RF circuit 604 communicates with the base stations 10*a* to 10*c* via the antenna 603. For example, the RF circuit 604, the processor 602, and the memory 601 achieve the function of the radio control unit 101 illustrated in FIG. 3.

The processor 602 and the memory 601 achieve the functions of the radio control unit 101, the measuring unit 105, the coupling control unit 106, the PG determining unit 107, the HO control unit 108, the scan processing unit 109, and the like illustrated in FIG. 3. The processor 602 and the memory 601 achieve, for example, the functions of the code presence/absence determining unit 210, the action performing unit 211, and the like illustrated in FIG. 9. The processor 602 and the memory 601 achieve, for example, the functions of the coupling control unit 306, the scan processing unit 309, and the like illustrated in FIG. 12. The processor 602 and the memory 601 achieve, for example, the functions of the coupling control unit 406 and the like illustrated in FIG. 14. The processor 602 and the memory 601 achieve, for example, the functions of the scan processing unit 509 and the like illustrated in FIG. 19.

For example, the processor 602 reads out the various types of programs stored in the memory 601 to generate a process for achieving various types of functions on the memory 601. The processor 602 performs various types of processing by performing, together with the units, the process generated on the memory 601.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio communication terminal comprising:

a memory; and a processor coupled to the memory and configured to be controlled by one of a plurality of base stations, each base station being divided into a plurality of base station groups, each base station group including at least one base station among the plurality of base stations, to receive a first signal from a first base station among the plurality of base stations when the radio communication terminal is controlled by the first base station, the first signal indicating awake periods during which the radio communication terminal is awake for receiving from the first base station in an intermittent reception period that includes the awake periods and sleep periods during which the radio communication terminal sleeps, to receive at least one second signal within the awake periods from at least one other base station other than the first base station among the plurality of base stations, each second signal being transmitted from each base station and identifying one of the plurality of base station groups that includes the base station, to select a second base station being to control the radio communication terminal instead of the first base station based on the received at least one second signal, among the at least one other base station of which base station group is same as a base station group of the first base station, with higher priority than the at least one other base station of which base station group is different from a base station group of the first base station.

2. The communication terminal according to the claim 1, wherein the processor is further configured to perform, when an instruction for an action of the communication terminal is received from the at least one other base station, the action.

3. The communication terminal according to the claim 1, wherein the processor is further configured to measure, before selecting a second base station, each of reception qualities from each of the at least one other base station;

to communicate to each of the at least one other base station sequentially in an order of descending each of the reception qualities in the intermittent reception period, and to stop, when the second base station is selected, communicating to a rest of the at least one other base station.

4. The communication terminal according to the claim 1, wherein the first base station sends a first group identification information to a second communication terminal in a second intermittent reception period, and the processor is further configured to identify the second intermittent reception period based on the intermittent reception period and a reception log, and to communicate to each of the at least one other base station sequentially in the intermittent reception period or the second intermittent reception period.

5. The communication terminal according to the claim 1, wherein the first base station sends a first group identification information to a second communication terminal in a second intermittent reception period, and the processor is further configured to identify the second intermittent reception period based on the intermittent reception period and a reception log, and to measure, before selecting the second base station, each of reception qualities from each of the at least one other base station in the intermittent reception period or the second intermittent reception period.

6. The radio communication terminal according to claim 1, wherein the processor is configured to start to receive the at least one second signal within the awake periods, when a reception quality of a radio signal of the first base station is lower than a threshold value and when the radio communication terminal receives broadcast information indicating each base station group of each of the at least one other base station from the first base station.

7. The radio communication terminal according to claim 1, wherein the processor is configured, when the second signal is not received from a specified base station among the plurality of base stations other than the first base station, not to select the specified base station to be the second base station.

8. A radio communication terminal communication method comprising:

being controlled by one of a plurality of base stations, each base station being divided into a plurality of base station groups, each base station group including at least one base station among the plurality of base stations, receiving a first signal from a first base station among the plurality of base stations when the radio communication terminal is controlled by the first base station, the first signal indicating awake periods during which the radio communication terminal is awake for receiving from the first base station in an intermittent reception period that includes the awake periods and sleep periods during which the radio communication terminal sleeps, receiving at least one second signal within the awake periods from at least one other base station other than the first base station among the plurality of base stations, each second signal being transmitted from each base station and identifying one of the plurality of base station groups that includes the base station, selecting a second base station being to control the radio communication terminal instead of the first base station based on the received at least one second signal, among the at least one other base station of which base station group is same as a base station group of the first base station, with higher priority than the at least one other base station of which base station group is different from a base station group of the first base station.

9. The communication method according to the claim 8, further comprising:

performing, when an instruction for an action of the communication terminal is received from the at least one other base station, the action.

10. The communication method according to the claim 8, further comprising:

measuring, before selecting a second base station, each of the reception qualities from each of the at least one other base station;

wherein the communicating communicates to each of the at least one other base station sequentially in an order of descending each of reception qualities in the intermittent reception period, and stops, when the second base station is selected, communicating to a rest of the at least one other base station.

11. The communication method according to the claim 8, wherein the first base station sends a first group identification information to a second communication terminal in a second intermittent reception period, and identifying the second intermittent reception period based on the intermittent reception period and a reception log, and communicating to each of the at least one other base station sequentially in the intermittent reception period or the second intermittent reception period.

12. The communication method according to the claim 8, wherein the first base station sends a first group identification information to a second communication terminal in a second intermittent reception period, and identifying the second intermittent reception period based on the intermittent reception period and a reception log, and the communication method further comprises:

measuring, before selecting the second base station, each of reception qualities from each of the at least one other base station in the intermittent reception period or the second intermittent reception period.

13. The communication method according to claim 8, wherein receiving the at least one second signal within the awake periods, when a reception quality of a radio signal of the first base station is lower than a threshold value and when the radio communication terminal receives broadcast information indicating each base station group of each of the at least one other base station from the first base station.

14. The communication method according to claim 8, wherein when the second signal is not received from a specified base station among the plurality of base stations other than the first base station, not to select the specified base station to be the second base station.

* * * * *